US012720506B2

(12) United States Patent
Wang et al.

(10) Patent No.: US 12,720,506 B2
(45) Date of Patent: Aug. 25, 2026

(54) TRANSMITTING ELECTRONIC DEVICE AND RECEIVING ELECTRONIC DEVICES FOR WIRELESS COMMUNICATION, AND METHOD

(71) Applicant: Sony Group Corporation, Tokyo (JP)

(72) Inventors: Xiaoxue Wang, Beijing (CN); Chen Sun, Beijing (CN)

(73) Assignee: Sony Group Corporation, Tokyo (JP)

( * ) Notice: Subject to any disclaimer, the term of this patent is extended or adjusted under 35 U.S.C. 154(b) by 301 days.

(21) Appl. No.: 18/565,225

(22) PCT Filed: Jun. 1, 2022

(86) PCT No.: PCT/CN2022/096589
§ 371 (c)(1),
(2) Date: Nov. 29, 2023

(87) PCT Pub. No.: WO2022/257827
PCT Pub. Date: Dec. 15, 2022

(65) Prior Publication Data

US 2024/0260008 A1 Aug. 1, 2024

(30) Foreign Application Priority Data

Jun. 8, 2021 (CN) ........................ 202110639438.4

(51) Int. Cl.
*H04W 72/044* (2023.01)

(52) U.S. Cl.
CPC ................................ *H04W 72/044* (2013.01)

(58) Field of Classification Search
CPC ... H04W 72/044; H04L 5/0094; H04L 5/0053
See application file for complete search history.

(56) References Cited

U.S. PATENT DOCUMENTS 11,483,800 B2 * 10/2022 Wang .................... H04W 72/02
11,553,503 B2 * 1/2023 Parron .................... H04W 4/46
(Continued)

FOREIGN PATENT DOCUMENTS

CN 104869652 A 8/2015
CN 105992364 A 10/2016
(Continued)

OTHER PUBLICATIONS

3GPP (3GPP TSG, RAN WG1 Meeting #104-e, R1-2100746, e-Meeting, Jan. 25- Feb. 5, 2021; hereinafter 3GPP746) (Year: 2021).*

(Continued)

*Primary Examiner* — Michael A Keller
(74) *Attorney, Agent, or Firm* — XSENSUS LLP

(57) ABSTRACT

The present disclosure discloses a transmitting electronic device and receiving electronic devices for wireless communication, and a method. The transmitting electronic device for wireless communication comprises a processing circuit, and the processing circuit is configured to: by means of predetermined information, use an event trigger manner to request that at least one receiving electronic device among receiving electronic devices communicating with the processing circuit report assistance information that is used for assisting a transmitting electronic device to sense a time-frequency resource block, and receive the assistance information reported via a non-periodic channel of the at least one receiving electronic device.

18 Claims, 14 Drawing Sheets

AGC
PSFACH
TX UE1
TX UE2
TX UE3
PSFCH
AGC

(56) References Cited

U.S. PATENT DOCUMENTS

| | | | | |
|---|---|---|---|---|
| 11,871,442 | B2 * | 1/2024 | Wang | H04W 72/02 |
| 2015/0119056 | A1 * | 4/2015 | Lee | H04W 56/002 455/450 |
| 2017/0331620 | A1 * | 11/2017 | Tsai | H04L 7/042 |
| 2018/0234977 | A1 * | 8/2018 | Yasukawa | H04W 48/16 |
| 2019/0059115 | A1 * | 2/2019 | Uchiyama | H04W 92/18 |
| 2020/0328861 | A1 * | 10/2020 | Malladi | H04L 5/0069 |
| 2021/0282116 | A1 * | 9/2021 | Balasubramanian | H04B 7/0695 |
| 2021/0320749 | A1 * | 10/2021 | Liu | H04L 5/0094 |
| 2021/0352628 | A1 | 11/2021 | Lee | |
| 2021/0410126 | A1 * | 12/2021 | Ganesan | H04L 5/0014 |
| 2022/0022168 | A1 * | 1/2022 | Wang | H04W 4/44 |
| 2022/0116147 | A1 * | 4/2022 | Hou | H04W 4/70 |
| 2022/0116925 | A1 * | 4/2022 | Fouad | H04W 72/51 |
| 2022/0217767 | A1 * | 7/2022 | Lee | H04L 1/1812 |
| 2022/0225288 | A1 * | 7/2022 | Park | H04W 72/02 |
| 2022/0232585 | A1 * | 7/2022 | Park | H04W 72/23 |
| 2022/0303044 | A1 * | 9/2022 | Sakhnini | H04L 27/2646 |
| 2022/0322302 | A1 * | 10/2022 | Park | H04W 72/20 |
| 2022/0338189 | A1 * | 10/2022 | Madadi | H04B 17/3913 |
| 2022/0417917 | A1 * | 12/2022 | Fakoorian | H04W 4/023 |
| 2023/0032174 | A1 * | 2/2023 | Li | H04W 72/02 |
| 2023/0143979 | A1 * | 5/2023 | Luo | H04W 4/50 370/329 |
| 2023/0300857 | A1 * | 9/2023 | Deng | H04W 72/11 370/329 |
| 2023/0379886 | A1 * | 11/2023 | Wang | H04W 4/023 |
| 2024/0023138 | A1 * | 1/2024 | Zhao | H04L 5/0053 |
| 2024/0057121 | A1 * | 2/2024 | Ganesan | H04L 1/1819 |
| 2024/0080868 | A1 * | 3/2024 | Selvanesan | H04W 72/40 |
| 2024/0172167 | A1 * | 5/2024 | Wang | H04W 72/25 |
| 2024/0323910 | A1 * | 9/2024 | Pan | H04L 5/0053 |
| 2025/0168805 | A1 * | 5/2025 | Li | H04B 17/328 |
| 2025/0227727 | A1 * | 7/2025 | Yang | H04W 28/26 |

FOREIGN PATENT DOCUMENTS

| | | | | | |
|---|---|---|---|---|---|
| CN | 107371233 | B | * | 10/2020 | H04W 56/0015 |
| CN | 111865504 | A | | 10/2020 | |
| CN | 111901783 | A | | 11/2020 | |
| CN | 112333661 | A | | 2/2021 | |
| CN | 113543083 | A | | 10/2021 | |
| CN | 110225585 | B | * | 3/2023 | H04W 76/36 |
| CN | 115997436 | A | * | 4/2023 | H04W 72/02 |
| EP | 4221271 | A1 | * | 8/2023 | H04W 72/02 |
| EP | 4224962 | A1 | * | 8/2023 | H04L 5/0044 |
| EP | 4329412 | A1 | * | 2/2024 | H04W 72/02 |
| EP | 4383870 | A1 | * | 6/2024 | H04W 4/40 |
| KR | 20220138809 | A | * | 10/2022 | H04W 4/40 |
| KR | 20240022281 | A | * | 2/2024 | H04W 28/0289 |
| WO | WO-2015139391 | A1 | * | 9/2015 | H04W 72/1215 |
| WO | 2017/161494 | A1 | | 9/2017 | |
| WO | WO-2017169111 | A1 | * | 10/2017 | H04W 74/0841 |
| WO | WO-2018029620 | A1 | * | 2/2018 | H04W 72/543 |
| WO | 2018/174770 | A1 | | 9/2018 | |
| WO | WO-2018175553 | A1 | * | 9/2018 | H04W 72/23 |
| WO | WO-2019031926 | A1 | * | 2/2019 | H04W 72/56 |
| WO | WO-2019165943 | A1 | * | 9/2019 | H04W 72/0453 |
| WO | WO-2020051911 | A1 | * | 3/2020 | H04W 74/0816 |
| WO | WO-2020060276 | A1 | * | 3/2020 | H04W 72/56 |
| WO | WO-2022078272 | A1 | * | 4/2022 | H04W 72/542 |
| WO | WO-2022257827 | A1 | * | 12/2022 | H04L 5/0094 |
| WO | WO-2023012885 | A1 | * | 2/2023 | H04W 4/40 |
| WO | WO-2023014795 | A1 | * | 2/2023 | H04W 64/00 |
| WO | WO-2023062703 | A1 | * | 4/2023 | H04W 72/20 |
| WO | WO-2023062704 | A1 | * | 4/2023 | H04W 72/02 |
| WO | WO-2024069439 | A1 | * | 4/2024 | H04W 64/00 |
| WO | WO-2024157234 | A1 | * | 8/2024 | H04W 72/25 |
| WO | WO-2024171411 | A1 | * | 8/2024 | H04W 72/54 |

OTHER PUBLICATIONS

3GPP (3GPP TSG-RAN WG2 Meeting #113-electronic, R2-2100142, Online, Jan. 25-Feb. 5, 2021; hereinafter 3GPP142) (Year: 2021).*

3GPP TS 38.300 V16.2.0 (Jul. 2020), Technical Specification, 3rd Generation Partnership Project; Technical Specification Group Radio Access Network; NR; NR and NG-RAN Overall Description; Stage 2 (Release 16), 2020; hereinafter 3GPP300) (Year: 2020).*

International Search Report and Written Opinion mailed on Jul. 25, 2022, received for PCT Application PCT/CN2022/096589, filed on Jun. 1, 2022, 11 pages including English Translation.

Sony, "Discussion on inter-UE coordination for Mode 2 enhancements", 3GPP TSG RAN WG1 #105-e, R1-2105178, May 10-27, 2021, 5 pages.

Fujitsu, "Considerations on Inter-UE Coordination for Mode 2 Enhancements", 3GPP TSG RAN WG1, meeting #104-e, R1-2100746, Jan. 25-Feb. 5, 201, eMeeting.

OPPO, "Inter-UE coordination in mode 2 of NR sidelink", 3GPP TSG RAN WG1 #104-e, R1-2100142, Jan. 25-Feb. 5, 2021, e-Meeting.

* cited by examiner

S1300

Start

S1302

Receive assistance information reported from at least one receiving electronic apparatus of receiving electronic apparatuses in communication with a transmitting electronic apparatus with a predetermined period and via a predetermined channel

S1304

End

S1306

TRANSMITTING ELECTRONIC DEVICE AND RECEIVING ELECTRONIC DEVICES FOR WIRELESS COMMUNICATION, AND METHOD

CROSS-REFERENCE TO RELATED APPLICATIONS

The present application is based on PCT filing PCT/CN2022/096589, filed on Jun. 1, 2022, which claims priority to Chinese Patent Application No. 202110639438.4, titled "TRANSMITTING ELECTRONIC DEVICE AND RECEIVING ELECTRONIC DEVICES FOR WIRELESS COMMUNICATION, AND METHOD", filed on Jun. 8, 2021 with the China National Intellectual Property Administration, which is incorporated herein by reference in its entirety.

FIELD

The present disclosure relates to the technical field of wireless communications, in particular to transmission of assistance information for assisting a transmitting electronic apparatus in perceiving time-frequency resource blocks so as to select a time-frequency resource block, and more particularly to a transmitting electronic apparatus, a receiving electronic apparatus and a method for wireless communication.

BACKGROUND

In the existing communication mode, it is beneficial for the receiving UE (user equipment) to help, by transmitting assistance information, the transmitting UE perceive time-frequency resource blocks so as to select a time-frequency resource block. How to notify the receiving UE to transmit the assistance information and which resources to be utilized to transmit the assistance information are key issues.

SUMMARY

A brief summary of the present disclosure is given below, to provide a basic understanding of some aspects of the present disclosure. It should be understood that the following summary is not an exhaustive summary of the present disclosure. It does not intend to determine a key or important part of the present disclosure, nor does it intend to limit the scope of the present disclosure. Its object is only to present some concepts in a simplified form, which serves as a preamble of a more detailed description to be discussed later.

According to an aspect of the present disclosure, there is provided a transmitting electronic apparatus for wireless communication. The transmitting electronic apparatus includes processing circuitry, and the processing circuitry is configured to: request by predetermined information, in a manner of event trigger, at least one receiving electronic apparatus of receiving electronic apparatuses in communication with the transmitting electronic apparatus to report assistance information for assisting the transmitting electronic apparatus to perceive a time-frequency resource block, and receive the assistance information reported via an aperiodic channel of the at least one receiving electronic apparatus.

According to an aspect of the present disclosure, there is provided a receiving electronic apparatus for wireless communication. The receiving electronic apparatus includes processing circuitry, and the processing circuitry is configured to: receive, by predetermined information of at least one transmitting electronic apparatus of transmitting electronic apparatuses in communication with the receiving electronic apparatus, an indication which requests to report assistance information for assisting the at least one transmitting electronic apparatus to perceive a time-frequency resource block in a manner of event trigger, and report the assistance information to the at least one transmitting electronic apparatus via an aperiodic channel.

According to an aspect of the present disclosure, there is provided a receiving electronic apparatus for wireless communication. The receiving electronic apparatus includes processing circuitry, and the processing circuitry is configured to: report assistance information to at least one transmitting electronic apparatus of transmitting electronic apparatuses in communication with the receiving electronic apparatus with a predetermined period and via a predetermined channel, where the assistance information is used for assisting the at least one transmitting electronic apparatus to perceive a time-frequency resource block.

According to an aspect of the present disclosure, there is provided a transmitting electronic apparatus for wireless communication. The transmitting electronic apparatus includes processing circuitry, and the processing circuitry is configured to: receive assistance information reported from at least one receiving electronic apparatus of receiving electronic apparatuses in communication with the transmitting electronic apparatus with a predetermined period and via a predetermined channel, wherein the assistance information is used for assisting the transmitting electronic apparatus to perceive a time-frequency resource block.

According to an aspect of the present disclosure, there is provided a transmitting electronic apparatus for wireless communication. The transmitting electronic apparatus includes processing circuitry, and the processing circuitry is configured to: request by predetermined information, in a manner of event trigger, at least one receiving electronic apparatus of receiving electronic apparatuses in communication with the transmitting electronic apparatus to report assistance information for assisting the transmitting electronic apparatus to perceive a time-frequency resource block, and receive the assistance information from a periodic channel of the at least one receiving electronic apparatus.

According to an aspect of the present disclosure, there is provided a receiving electronic apparatus for wireless communication. The receiving electronic apparatus includes processing circuitry, and the processing circuitry is configured to: receive, by predetermined information of at least one transmitting electronic apparatus of transmitting electronic apparatuses in communication with the receiving electronic apparatus, an indication which requests to report assistance information for assisting the at least one transmitting electronic apparatus to perceive a time-frequency resource block in a manner of event trigger, and transmit the assistance information to the at least one transmitting electronic apparatus via a periodic channel.

According to an aspect of the present disclosure, there is provided a method for wireless communication. The method is performed by a transmitting electronic apparatus, and includes: requesting by predetermined information, in a manner of event trigger, at least one receiving electronic apparatus of receiving electronic apparatuses in communication with the transmitting electronic apparatus to report assistance information for assisting the transmitting electronic apparatus to perceive a time-frequency resource block, and receiving the assistance information reported via an aperiodic channel of the at least one receiving electronic apparatus.

According to an aspect of the present disclosure, there is provided a method for wireless communication. The method is performed by a receiving electronic apparatus, and includes: receiving, by predetermined information of at least one transmitting electronic apparatus of transmitting electronic apparatuses in communication with the receiving electronic apparatus, an indication which requests to report assistance information for assisting the at least one transmitting electronic apparatus to perceive a time-frequency resource block in a manner of event trigger, and transmitting the assistance information to the at least one transmitting electronic apparatus via an aperiodic channel.

According to an aspect of the present disclosure, there is provided a method for wireless communication. The method is performed by a receiving electronic apparatus, and includes: reporting assistance information to at least one transmitting electronic apparatus of transmitting electronic apparatuses in communication with the receiving electronic apparatus with a predetermined period and via a predetermined channel, where the assistance information is used for assisting the at least one transmitting electronic apparatus to perceive a time-frequency resource block.

According to an aspect of the present disclosure, there is provided a method for wireless communication. The method is performed by a transmitting electronic apparatus, and includes: receiving assistance information reported from at least one receiving electronic apparatus of receiving electronic apparatuses in communication with the transmitting electronic apparatus with a predetermined period and via a predetermined channel, where the assistance information is used for assisting the transmitting electronic apparatus to perceive a time-frequency resource block.

According to an aspect of the present disclosure, there is provided a method for wireless communication. The method is performed by a transmitting electronic apparatus, and includes: requesting by predetermined information, in a manner of event trigger, at least one receiving electronic apparatus of receiving electronic apparatuses in communication with the transmitting electronic apparatus to report assistance information for assisting the transmitting electronic apparatus to perceive a time-frequency resource block, and receiving the assistance information from a periodic channel of the at least one receiving electronic apparatus.

According to an aspect of the present disclosure, there is provided a method for wireless communication. The method is performed by a receiving electronic apparatus, and includes: receiving, by predetermined information of at least one transmitting electronic apparatus of transmitting electronic apparatuses in communication with the receiving electronic apparatus, an indication which requests to report assistance information for assisting the at least one transmitting electronic apparatus to perceive a time-frequency resource block in a manner of event trigger, and transmitting the assistance information to the at least one transmitting electronic apparatus via a periodic channel.

According to other aspects of the present disclosure, there are further provided a computer program code and a computer program product for implementing the method for wireless communication, as well as a computer-readable storage medium on which the computer program code for implementing the method for wireless communication is recorded.

These and other advantages of the present disclosure will be more apparent through the following detailed description of preferred embodiments of the present disclosure in conjunction with the accompanying drawings.

BRIEF DESCRIPTION OF THE DRAWINGS

In order to further set forth the above and other advantages and features of the present disclosure, specific embodiments of the present disclosure will be further described in detail below in conjunction with the accompanying drawings. The accompanying drawings together with the following detailed description are included in this specification and form a part of this specification. Elements with identical functions and structures are denoted by identical reference numerals. It should be understood that, the drawings only describe typical examples of the present disclosure, and should not be regarded as limitations to the scope of the present disclosure. In the drawings.

DETAILED DESCRIPTION OF THE EMBODIMENTS

Figure 1:
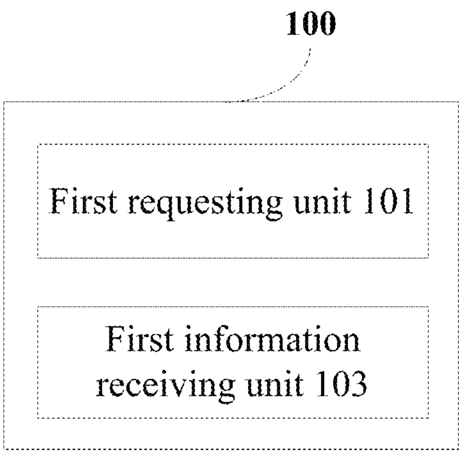
FIG. 1 is a block diagram showing functional modules of a transmitting electronic apparatus for wireless communication according to an embodiment of the present disclosure.

Hereinafter, exemplary embodiments of the present disclosure will be described in conjunction with the accompanying drawings. For the sake of clarity and conciseness, the description does not describe all features of actual embodiments. However, it should be understood that in developing any such actual embodiment, many decisions specific to the embodiments must be made, so as to achieve specific objects of a developer: for example, those limitation conditions related to systems and services are satisfied, and these limitation conditions possibly will vary as embodiments are different. In addition, it should also be appreciated that, although developing work may be very complicated and time-consuming, such developing work is only routine tasks for those skilled in the art benefiting from the present disclosure.

It should also be noted herein that, to avoid the present disclosure from being obscured due to unnecessary details, only those apparatus structures and/or processing steps closely related to the solution according to the present disclosure are shown in the accompanying drawings, while omitting other details not closely related to the present disclosure.

In 5G NR sidelink communication, there are two resource selection methods. One is that the base station schedules sidelink resources, which is called resource selection mode 1 (mode 1). The other is that the UE independently selects resources, which is called resource selection mode 2 (mode 2).

In Rel-16 NR sidelink communication, only the transmitting UE perceives time-frequency resources and selects resources from the perceived available candidate time-frequency resources. However, this mechanism often has the following problems.

(1) Hidden node problem. In addition to the transmitting UE and the receiving UE, there is another transmitting UE that is close to the receiving UE but far from the transmitting UE. Since the distance with the other transmitting UE exceeds the communication range, the transmitting UE cannot obtain the SCI (sidelink control information) sent by the other transmitting UE, and fails to avoid the time-frequency resources occupied by the other transmitting UE. This will cause the transmitting UE and other transmitting UE to use the same time-frequency resource to transmit data to the receiving UE, resulting in resource collision.

(2) Exposure node problem. In addition to the transmitting UE and the receiving UE, there is another transmitting UE that is close to the transmitting UE. Since the transmitting UE and the other transmitting UE can receive SCI from the other, and can avoid the time-frequency resources selected by the other. However, the other transmitting UE may use a certain time-frequency resource to transmit information to other receiving UE. Since the other receiving UE is far away from both the transmitting UE and the receiving UE, the transmitting UE can use the same resource as the other transmitting UE. However, due to the existence of exposed nodes, these available resources are excluded, resulting in a waste of resources.

(3) Half-duplex problem. Since the sidelink UE is half-duplex, the UE cannot both transmit and receive data in the same slot. In the time slot for transmitting data, the UE does not have the capability of monitoring and sensing. In order to ensure the correctness of data transmission, the UE excludes all candidate time-frequency resources in time slots that are not monitored. This may cause excessive exclusion of resources, thereby reducing resource utilization.

In Rel-17 NR sidelink communication, it is proposed to perceive time-frequency resources through cooperation between UEs, in order to increase communication reliability.

FIG. 1 is a block diagram showing functional modules of a transmitting electronic apparatus 100 for wireless communication according to an embodiment of the present disclosure. As shown in FIG. 1, the transmitting electronic apparatus 100 includes a first requesting unit 101 and a first information receiving unit 103. The first request unit 101 is configured to request by predetermined information, in a manner of event trigger, at least one receiving electronic apparatus of receiving electronic apparatuses in communication with the transmitting electronic apparatus to report assistance information for assisting the transmitting electronic apparatus 100 to perceive time-frequency resource block(s). The first information receiving unit 103 is configured to receive the assistance information reported via an aperiodic channel of the at least one receiving electronic apparatus.

The first requesting unit 101 and the first information receiving unit 103 may be implemented by one or more processing circuitries which may be implemented as, for example, a chip.

The transmitting electronic apparatus 100 may be arranged on user equipment (UE) side or communicably connected to a UE, for example. It should also be noted herein that, the transmitting electronic apparatus 100 may be implemented at chip level or at apparatus level. For example, the transmitting electronic apparatus 100 may work as user equipment itself, and may also include external devices such as a memory, a transceiver (not shown in the drawings) and the like. The memory may be configured to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be, for example, an eNB or a gNB.

It should be noted that the transmitting electronic apparatus in the present disclosure can not only transmit data but also receive data. The receiving electronic apparatus can not only receive data but also transmit data. In the present disclosure, in the case of emphasizing the function of transmitting data of the electronic apparatus, the electronic apparatus is referred to as a transmitting electronic apparatus. In the case of emphasizing the function of receiving data of the electronic apparatus, the electronic apparatus is referred to as a receiving electronic apparatus.

For example, the event may be the arrival of a data packet at the transmitting electronic apparatus 100. For example, the event may be that the transmitting electronic apparatus 100 receives a request for allocating time-frequency resource blocks for other electronic apparatus. Those skilled in the art can also think of other examples of events, which are not detailed here.

The transmitting electronic apparatus 100 may select a required set of candidate time-frequency resources for the communication between it and the receiving electronic apparatus. For example, the transmitting electronic apparatus 100 may perceive time-frequency resource blocks based on the received assistance information, to select the set of candidate time-frequency resources.

By analyzing and using the assistance information reported by the receiving electronic apparatus, the transmitting electronic apparatus 100 can more accurately select the set of candidate time-frequency resources, thereby avoiding hidden node problems, exposed node problems, and half-duplex problems. In addition, the above-mentioned request is triggered only when an event occurs, that is, the above request is dynamically performed and the assistance information is dynamically received in the manner of event trigger. Therefore, assistance information is not frequently received from the receiving electronic apparatus, thereby reducing the overhead of resources for transmitting the assistance information and reducing congestion of a communication channel. For example, normal communication can be guaranteed under conditions such as high static code rate CBR.

For example, the first information receiving unit 103 may be configured to receive the assistance information in a scenario of sidelink resource selection mode 2.

In the following, the dynamic request and reception of the assistance information by the transmitting electronic apparatus 100 is mainly described in conjunction with the scenario of sidelink resource selection mode 2. However, those skilled in the art can understand that the following description about dynamically requesting and receiving the assistance information is not limited to the scenario of sidelink resource selection mode 2. Instead, the description can be applied to other scenarios of dynamically requesting and receiving the assistance information in 4G or 5G or other communication modes.

For example, the predetermined information may be SCI. The SCI may include first phase SCI as control information transmitted on a control channel or second phase SCI as control information transmitted on a data channel. The aperiodic channel may be the second phase SCI. The transmitting electronic apparatus 100 receives the assistance information reported by the second phase SCI of the receiving electronic apparatus, so as to ensure the integrity and accuracy of the assistance information.

For example, the predetermined information may be a media access control element (MAC CE). The aperiodic channel may be a physical sidelink shared channel (PSSCH). The transmitting electronic apparatus 100 receives the assistance information reported via the PSSCH of the receiving electronic apparatus, thereby ensuring the integrity and accuracy of the assistance information.

For example, the first requesting unit 101 may be configured to transmit the above request through an assistance request field included in the predetermined information. For example, the assistance request field may be a two-bit field (for example, the first request uniting 101 may transmit the request through two bits with a value of "00"). Those skilled in the art can understand that the assistance request field may also include other numbers of bits, which are not detailed herein.

For example, the first requesting unit 101 may be configured to receive reflection information based on the assistance request field in the predetermined information fed back from at least one receiving electronic apparatus. The reflection information is used to reflect whether the time-frequency resource block involved in the assistance information is a time-frequency resource block recommended for use by the transmitting electronic apparatus 100 or a time-frequency resource block not recommended for use by the transmitting electronic apparatus 100.

For example, when the first requesting unit 101 transmits the request through the assistance request field in the SCI, the receiving electronic apparatus uses the assistance request field in its SCI to inform the transmitting electronic apparatus 100 of the meaning of the assistance information fed back. When the first request unit 101 transmits the request through the assistance request field in MAC CE, the receiving electronic apparatus uses the assistance request field in its MAC CE to inform the transmitting electronic apparatus 100 of the meaning of the assistance information fed back.

For example, the receiving electronic apparatus notifies whether the time-frequency resource block recommended for use by the transmitting electronic apparatus 100 or the time-frequency resource block not recommended for use by the transmitting electronic apparatus 100 is fed back. This feedback depends on the capabilities of the receiving electronic apparatus itself and the perceived resources. For example, the receiving electronic apparatus may use the assistance request field with a value of "10" to indicate that the feedback is to recommend resources used by the transmitting electronic apparatus 100. Then the transmitting electronic apparatus 100 decodes the received assistance information to obtain the recommended time-frequency resource block. The transmitting electronic apparatus 100 with weak capability or no resource sensing function directly uses these time-frequency resource blocks to transmit data. The transmitting electronic apparatus 100 with stronger capability performs union and/or intersection of these time-frequency resource blocks and candidate time-frequency resources perceived by itself. For example, the receiving electronic apparatus uses an assistance request field with a value of "01" to indicate the resource not recommended for use by the transmitting electronic apparatus 100. After obtaining the information of the resources not recommended for use, the transmitting electronic apparatus 100 excludes these resources from the set of candidate time-frequency resources perceived by itself.

For example, the first requesting unit 101 is further configured to transmit data packet information related to the data packet of the transmitting electronic apparatus 100 to at least one receiving electronic apparatus.

For example, the data packet information includes the priority and/or the packet delay budget PDB of the data packet. The data packet information helps to find the time-frequency resource blocks suitable for transmitting the data packet.

For example, the first information receiving unit 103 is further configured to receive, from at least one receiving electronic apparatus, the perception type of the at least one receiving electronic apparatus for the time-frequency resource block and/or the discontinuous reception DRX configuration. The perception type includes full perception in which perception is performed throughout the entire period of time, partial perception in which perception is performed only on a part of the entire period, and random selection of time-frequency resource block without perception.

Corresponding to the transmitting electronic apparatus 100, a receiving electronic apparatus 200 for wireless communication is also provided according to the present disclosure.

Figure 2:
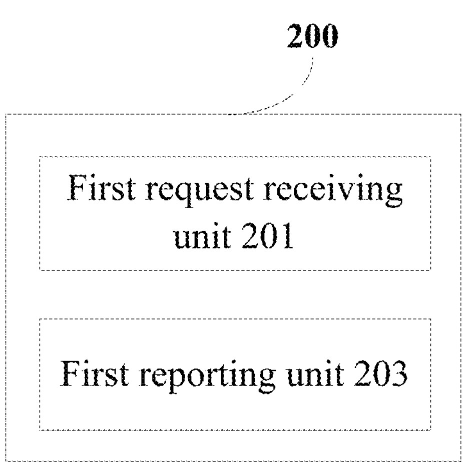
FIG. 2 is a schematic diagram showing functional modules of a receiving electronic apparatus for wireless communication according to an embodiment of the present disclosure.

FIG. 2 shows a block diagram of functional modules of a receiving electronic apparatus 200 for wireless communication according to an embodiment of the present disclosure. As shown in FIG. 2, the receiving electronic apparatus 200 includes a first request receiving unit 201 and a first reporting unit 203. The first request receiving unit 201 is configured to receive, by predetermined information of at least one transmitting electronic apparatus of transmitting electronic apparatuses in communication with the receiving electronic apparatus 200, an indication which requests to report assistance information for assisting the at least one transmitting electronic apparatus to perceive a time-frequency resource block in a manner of event trigger. The first reporting unit 203 is configured to transmit the assistance information to the at least one transmitting electronic apparatus via an aperiodic channel.

The first request receiving unit 201 and the first reporting unit 203 may be implemented by one or more processing circuitries which may be implemented as, for example, a chip.

The receiving electronic apparatus 200 may be arranged on user equipment (UE) side or communicably connected to a UE, for example. It should also be noted herein that, the receiving electronic apparatus 200 may be implemented at chip level or at apparatus level. For example, the receiving electronic apparatus 200 may work as user equipment itself, and may also include external devices such as a memory, a transceiver (not shown in the drawings) and the like. The memory may be configured to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be, for example, an eNB or a gNB.

A transmitting electronic apparatus corresponding to the receiving electronic apparatus 200 may be, for example, the transmitting electronic apparatus 100 described above.

For example, the event may be the arrival of a data packet at the transmitting electronic apparatus. For example, the event may be that the transmitting electronic apparatus receives a request for allocating time-frequency resource blocks for other electronic apparatuses. Those skilled in the art can also think of other examples of events, which are not detailed here.

The assistance information reported by the receiving electronic apparatus 200 may help the transmitting electronic apparatus to select a set of candidate time-frequency resources more accurately, thereby avoiding hidden node problems, exposed node problems, and half-duplex problems. In addition, the request is received only when an event occurs, that is, the request is dynamically received in a manner of event trigger and the assistance information is dynamically reported. Therefore, the assistance information is not reported frequently, thereby reducing resource overhead for transmitting assistance information and reducing congestion of a communication channel. For example, normal communication can be guaranteed under conditions such as high static code rate, CBR.

For example, the first reporting unit 203 may be configured to report the assistance information in a scenario of sidelink resource selection mode 2.

In the following, the scenario of the sidelink resource selection mode 2 is mainly used to describe how the receiving electronic apparatus 200 dynamically receives the request and reports the assistance information. However, those skilled in the art can understand that the following description about dynamically receiving a request and reporting assistance information is not limited to the scenario of sidelink resource selection mode 2. Instead, the description can be applied to other scenarios of dynamically receiving requests and reporting assistance information in 4G or 5G or other communication modes.

For example, the predetermined information may be SCI. The SCI may include first phase SCI as control information transmitted on a control channel or second phase SCI as control information transmitted on a data channel. The aperiodic channel may be the second phase SCI. The integrity and the accuracy of the assistance information can be guaranteed by reporting the assistance information via the second phase SCI.

For example, the predetermined information may be a MAC CE. The aperiodic channel may be a PSSCH. The integrity and the accuracy of the assistance information can be guaranteed by reporting the assistance information via the PSSCH.

For example, the first request receiving unit 201 may be configured to receive the request through an assistance request field included in the predetermined information. For example, the assistance request field may be a two-bit field (e.g., the transmitting electronic apparatus may send the request with two bits having a value of "00"). Those skilled in the art can understand that the assistance request field may also include other numbers of bits, which are not detailed herein.

For example, the first reporting unit 203 may be configured to feed back reflection information via an assistance request field in the predetermined information. The reflection information reflects whether the time-frequency resource block involved in the assistance information is a time-frequency resource block recommended for use by at least one transmitting electronic apparatus or a time-frequency resource block not recommended for use by at least one transmitting electronic apparatus.

For example, when the first request receiving unit 201 receives the request sent via the assistance request field in the SCI of the transmitting electronic apparatus, the receiving electronic apparatus 200 uses the assistance request field in its SCI to inform the transmitting electronic apparatus of the meaning of the fed back assistance information. In the case where the first request receiving unit 201 receives the request sent via the assistance request field in the MAC CE of the transmitting electronic apparatus, the receiving electronic apparatus 200 uses the assistance request field in its MAC CE to inform the transmitting electronic apparatus of the meaning of the fed back assistance information. For the description of the meaning of the fed back assistance information, reference is made to the corresponding part of the transmitting electronic apparatus 100, which will not be detailed here.

For example, the first request receiving unit 201 may be further configured to receive, from at least one transmitting electronic apparatus, data packet information about a data packet of at least one transmitting electronic apparatus.

For example, the data packet information includes the priority and/or the packet delay budget of the data packet. The data packet information helps to find the time-frequency resource blocks suitable for transmitting the data packet.

For example, the first reporting unit 203 may also be configured to report the perception type of the time-frequency resource block and/or discontinuous reception, DRX, configuration of the receiving electronic apparatus 200 to at least one transmitting electronic apparatus. The perception type includes full perception in which perception is performed throughout the entire period of time, partial perception in which perception is performed only on a part of the entire period, and random selection of time-frequency resource block without perception.

Figure 3:
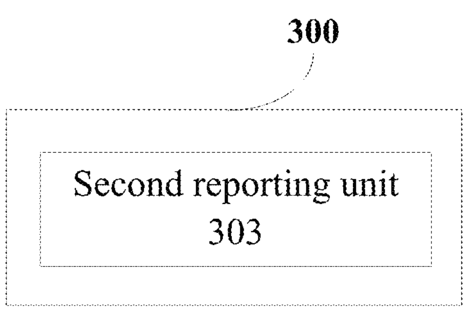
FIG. 3 is a schematic diagram showing functional modules of a receiving electronic apparatus for wireless communication according to another embodiment of the present disclosure.

FIG. 3 shows a block diagram of functional modules of a receiving electronic apparatus 300 for wireless communication according to another embodiment of the present disclosure. As shown in FIG. 3, the receiving electronic apparatus 300 includes a second reporting unit 303. The second reporting unit 303 is configured to report assistance information to at least one transmitting electronic apparatus of transmitting electronic apparatuses in communication with the receiving electronic apparatus with a predetermined period and via a predetermined channel. The assistance information is used for assisting the at least one transmitting electronic apparatus to perceive time-frequency resource block(s).

The second reporting unit 303 may be implemented by one or more processing circuitries which may be implemented as, for example, a chip.

The receiving electronic apparatus 300 may be arranged on user equipment (UE) side or communicably connected to a UE, for example. It should also be noted herein that, the receiving electronic apparatus 300 may be implemented at chip level or at apparatus level. For example, the receiving electronic apparatus 300 may work as user equipment itself, and may also include external devices such as a memory, a transceiver (not shown in the drawings) and the like. The memory may be configured to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be, for example, an eNB or a gNB.

The assistance information reported by the receiving electronic apparatus 300 may help the transmitting electronic apparatus to select a set of candidate time-frequency resources more accurately, thereby avoiding hidden node problems, exposed node problems, and half-duplex problems. In addition, by periodically configuring the transmission resource of the assistance information without receiving an instruction requesting to report the assistance information from the transmitting electronic apparatus, the interaction of control signaling can be reduced, thereby reducing the signaling overhead.

For example, the second reporting unit 303 may be configured to report the assistance information in a scenario of sidelink resource selection mode 2.

In the following, the scenario of the sidelink resource selection mode 2 is mainly used to describe that the receiving electronic apparatus 300 reports the assistance information periodically. However, those skilled in the art can understand that the following description about periodically reporting the assistance information is not limited to the scenario of sidelink resource selection mode 2. Instead, the description may be applied to other scenarios of periodically reporting assistance information in 4G or 5G or other communication modes.

For example, the predetermined channel is a physical sidelink feedback assistance channel (PSFACH) temporally associated with a physical sidelink feedback channel (PSFCH). The predetermined period is the same as the period of the PSFCH feeding back the hybrid automatic repeat request acknowledgment (HARQ-ACK).

By reporting the assistance information through a specific physical sidelink feedback assistance channel, transmission failure caused by collision of resources for transmitting assistance information can be avoided. The period of the physical sidelink channel feeding back the assistance information is the same as the feedback resource period of the PSFCH feeding back the HARQ-ACK. In this way, the number of times the receiving electronic apparatus 300 switches between the function of sending data and the function of receiving data can be reduced, thereby reducing energy consumption.

For example, the physical sidelink feedback assistance channel is realized by an orthogonal frequency division multiplexing, OFDM, symbol immediately before the PSFCH. In a scenario where the assistance information needs to be frequently exchanged, the physical sidelink feedback assistance channel that only occupies one OFDM symbol can report the assistance information with fewer resources, thereby saving resource overhead.

Figure 4:
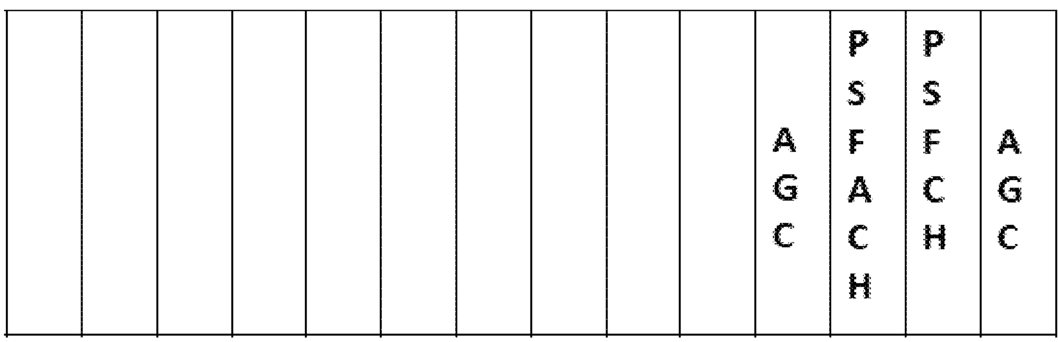
FIG. 4 is a diagram showing an example of a position of a physical sidelink feedback assistance channel in one communication time slot according to an embodiment of the present disclosure.

FIG. 4 is a diagram illustrating an example of a position of a physical sidelink feedback assistance channel in one communication slot according to an embodiment of the present disclosure.

As shown in FIG. 4, PSFACH may be an OFDM symbol immediately before PSFCH. For example, PSFACH can be realized through the 12th symbol, that is, the OFDM symbol in the time slot. In FIG. 4, AGC denotes automatic gain control.

Figure 5A:
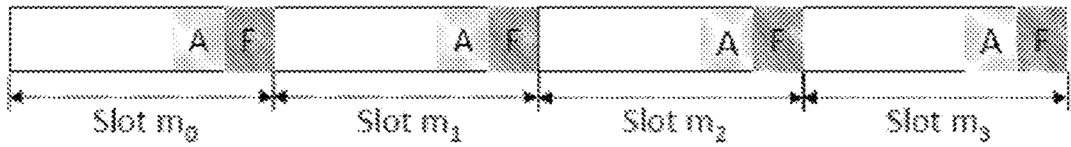
FIGS. 5A to 5C each are a diagram illustrating an example of positions of periodic occurrences of a physical sidelink feedback assistance channel according to an embodiment of the present disclosure.
Figure 5B:
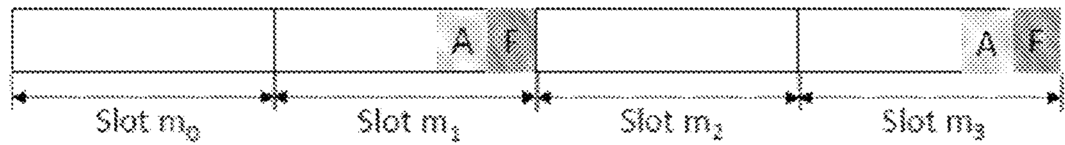
Figure 5C:
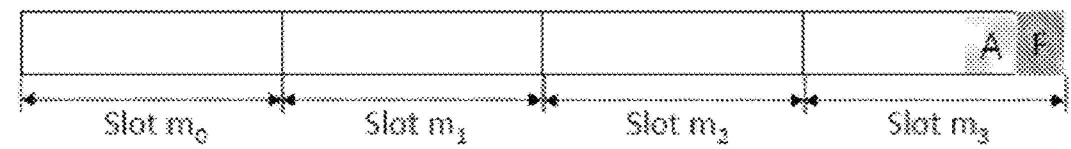

FIGS. 5A to 5C are diagrams illustrating examples of positions where a physical sidelink feedback assistance channel periodically occurs according to an embodiment of the present disclosure. In FIGS. 5A to 5C, the physical sidelink feedback assistance channel is simply denoted as A, and the physical sidelink feedback channel is simply denoted as F. In addition, in FIGS. 5A to 5C, four slots slot $m_0$ to slot $m_3$ are shown.

As shown above, the predetermined period of the PSFACH is the same as the period of the PSFCH feeding back the hybrid automatic repeat request acknowledgment HARQ-ACK.

In FIG. 5A, it is assumed that PSFCH occurs once in each time slot (slot $m_0$ to slot $m_3$), and PSFACH occurs once in each time slot (slot $m_1$ to slot $m_3$).

In FIG. 5B, it is assumed that PSFCH occurs once every two time slots (slot $m^1$ and slot $m_3$), and PSFACH occurs once every two time slots (slot $m_1$ and slot $m_3$).

In FIG. 5C, it is assumed that PSFCH occurs once every four slots (slot $m_3$), and PSFACH occurs once every four slots (slot $m_3$).

For example, the second reporting unit 303 may be configured to divide, in frequency; the time-frequency resource of the physical sidelink feedback assistance channel into frequency division multiplexed time-frequency resource blocks respectively corresponding to at least one transmitting electronic apparatus, and report to the corresponding transmitting electronic apparatus based on frequency division multiplexed time-frequency resource blocks.

In a scenario where one receiving electronic apparatus 300 is to send assistance information to multiple transmitting electronic apparatuses at the same time, frequency division multiplexing may be used to sort the PSFACHs required by different transmitting electronic apparatuses according to the index.

Figure 6:
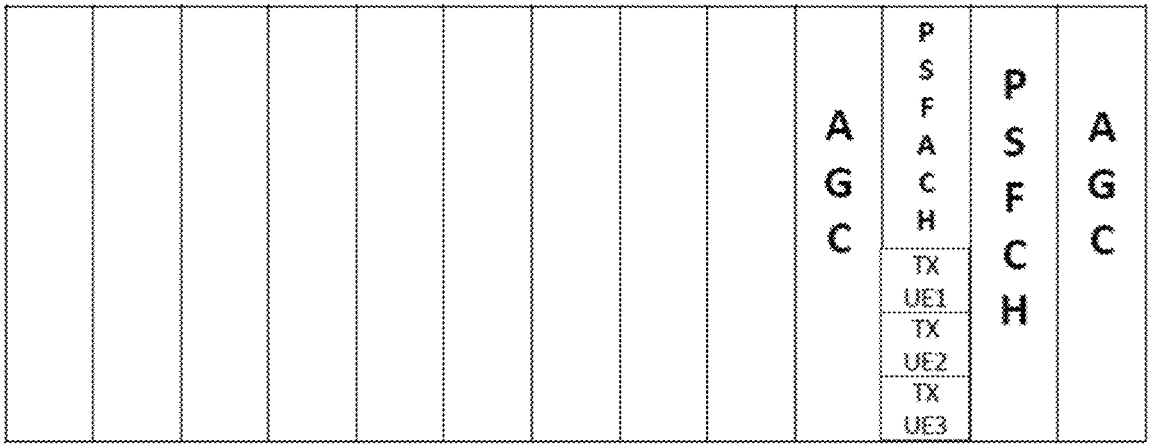
FIG. 6 is a diagram illustrating an example of frequency division of a physical sidelink feedback assistance channel according to an embodiment of the present disclosure.

FIG. 6 is a diagram illustrating an example of frequency division of a physical sidelink feedback assistance channel according to an embodiment of the present disclosure.

For example, according to the physical layer ID of the transmitting electronic apparatus, the time-frequency resources of the PSFACH may be divided into frequency division multiplexed time-frequency resource blocks in frequency. The divided time-frequency resource blocks are numbered so as to correspond respectively to the transmitting electronic apparatuses. For example, as shown in FIG. 6, the time-frequency resource of PSFACH is divided into frequency division multiplexed time-frequency resource blocks respectively corresponding to the transmitting electronic apparatuses TX UE1 to TX UE3. TX UE1 to TX UE3 only need to detect and decode the assistance information on corresponding time-frequency resources.

For example, the predetermined channel may be a physical sidelink shared channel (PSSCH). The indication field in the SCI indicates that what is transmitted by the PSSCH is assistance information. The SCI includes first phase SCI as control information transmitted on a control channel or second phase SCI as control information transmitted on a data channel.

For example, in the case that the predetermined channel is the PSSCH, the predetermined period may be configured through radio resource control (RRC) signaling. For example, the receiving electronic apparatus 300 is configured to sense and report assistance information every N time slots (where N is a positive integer greater than or equal to 1).

Using the PSSCH to report the assistance information can meet the channel requirement when the reported assistance information is detailed time-frequency resource blocks. That is, the size of the assistance information is guaranteed to be unlimited, and more and more accurate assistance information is transmitted.

Corresponding to the receiving electronic apparatus 300 described above, a transmitting electronic apparatus 700 for wireless communication is also provided according to the present disclosure.

Figure 7:
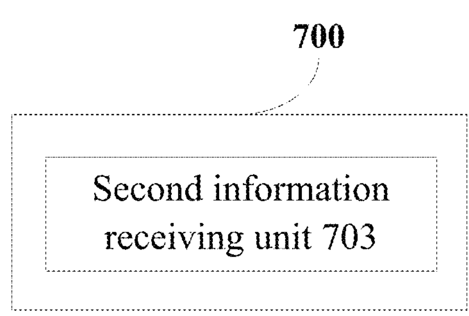
FIG. 7 is a schematic diagram showing functional modules of a transmitting electronic apparatus for wireless communication according to another embodiment of the present disclosure.

FIG. 7 shows a block diagram of functional modules of a transmitting electronic apparatus 700 for wireless communication according to another embodiment of the present disclosure. As shown in FIG. 7, the transmitting electronic apparatus 700 includes a second information receiving unit 703. The second information receiving unit 703 is configured to receive assistance information reported from at least one receiving electronic apparatus of receiving electronic apparatuses in communication with the transmitting electronic apparatus with a predetermined period and via a predetermined channel. The assistance information is used for assisting the transmitting electronic apparatus 700 to perceive a time-frequency resource block.

The second information receiving unit 703 may be implemented by one or more processing circuitries which may be implemented as, for example, a chip.

The transmitting electronic apparatus 700 may be arranged on user equipment (UE) side or communicably connected to a UE, for example. It should also be noted herein that, the transmitting electronic apparatus 700 may be implemented at chip level or at apparatus level. For example, the transmitting electronic apparatus 700 may work as user equipment itself, and may also include external devices such as a memory, a transceiver (not shown in the drawings) and the like. The memory may be configured to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be, for example, an eNB or a gNB.

A receiving electronic apparatus corresponding to the transmitting electronic apparatus 700 may be, for example, the receiving electronic apparatus 300 described above.

By analyzing and using the assistance information reported by the receiving electronic apparatus, the transmitting electronic apparatus 700 can more accurately select a set of candidate time-frequency resources, thereby avoiding hidden node problems, exposed node problems, and half-duplex problems. In addition, by periodically configuring the transmission resource of the assistance information without the transmitting electronic apparatus 700 to request to report the assistance information, interaction of control signaling can be reduced to reduce signaling overhead.

For example, the second information receiving unit 703 may be configured to receive assistance information in a scenario of sidelink resource selection mode 2.

In the following, the transmitting electronic apparatus 700 periodically receiving the assistance information is mainly described in conjunction with the scenario of sidelink resource selection mode 2. However, those skilled in the art can understand that the following description about periodically receiving assistance information is not limited to the scenario of sidelink resource selection mode 2. Instead, the description can be applied to other scenarios of periodically receiving assistance information in 4G or 5G or other communication modes.

For example, the predetermined channel may be a physical sidelink feedback assistance channel PSFACH temporally associated with the PSFCH of at least one receiving electronic apparatus. The predetermined period is the same as the period of the PSFCH feeding back the hybrid automatic repeat request acknowledgment HARQ-ACK.

The transmitting electronic apparatus 700 receives assistance information reported through a specific physical sidelink feedback assistance channel, which can avoid transmission failure caused by collision of resources for transmitting the assistance information.

For example, the physical sidelink feedback assistance channel is realized by an OFDM symbol immediately before the PSFCH. In a scenario where assistance information needs to be frequently exchanged, the physical sidelink feedback assistance channel that only occupies one OFDM symbol can report assistance information with fewer resources, thereby reducing resource overhead.

For an example of the PSFACH, reference may be made to the descriptions in conjunction with FIGS. 4 and 5, which will not be described in detail here.

For example, the predetermined channel may be PSSCH. The second information receiving unit 703 may be configured to learn that the PSSCH transmits assistance information through an indication field in the SCI received from at least one receiving electronic apparatus. The SCI includes first phase SCI as control information transmitted on a control channel or second phase SCI as control information transmitted on a data channel.

For example, in a case where the predetermined channel is the PSSCH, the predetermined period may be configured through radio resource control (RRC) signaling.

The transmitting electronic apparatus 700 receives the assistance information reported through the PSSCH, and can ensure that the size of the assistance information is not limited, so as to transmit more and more accurate assistance information.

Figure 8:
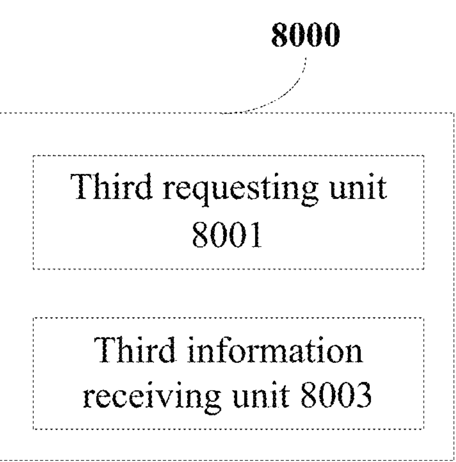
FIG. 8 is a schematic diagram showing functional modules of a transmitting electronic apparatus for wireless communication according to yet another embodiment of the present disclosure.

FIG. 8 shows a block diagram of functional modules of a transmitting electronic apparatus 8000 for wireless communication according to yet another embodiment of the present disclosure. As shown in FIG. 8, the transmitting electronic apparatus 8000 includes a third requesting unit 8001 and a third information receiving unit 8003. The third requesting unit 8001 is configured to request by predetermined information, in a manner of event trigger, at least one receiving electronic apparatus of receiving electronic apparatuses in communication with the transmitting electronic apparatus to report assistance information for assisting the transmitting electronic apparatus 8000 to perceive time-frequency resource block(s). The third information receiving unit 8003 is configured to receive the assistance information reported via a periodic channel of the at least one receiving electronic apparatus.

The third requesting unit 8001 and the third information receiving unit 8003 may be implemented by one or more processing circuitries which may be implemented as, for example, a chip.

The transmitting electronic apparatus 8000 may be arranged on user equipment (UE) side or communicably connected to a UE, for example. It should also be noted herein that, the transmitting electronic apparatus 8000 may be implemented at chip level or at apparatus level. For example, the transmitting electronic apparatus 8000 may work as user equipment itself, and may also include external devices such as a memory, a transceiver (not shown in the drawings) and the like. The memory may be configured to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be, for example, an eNB or a gNB.

For example, the event may be the arrival of a data packet at the transmitting electronic apparatus 8000. For example, the event may be that the transmitting electronic apparatus 8000 receives a request for allocating time-frequency resource blocks for other electronic apparatuses. Those skilled in the art can also think of other examples of the event, which are not detailed here.

By analyzing and using the assistance information reported by the receiving electronic apparatus, the transmitting electronic apparatus 8000 can more accurately select a set of candidate time-frequency resources, thereby avoiding hidden node problems, exposed node problems, and half-duplex problems. In addition, by semi-statically receiving the assistance information by triggering the request when an event occurs and periodically configuring resources for transmitting the assistance information, resource collisions for transmitting the assistance information can be reduced and excessive transmission of assistance information can be reduced.

For example, the third information receiving unit 8003 may be configured to receive the assistance information in a scenario of sidelink resource selection mode 2.

In the following, the semi-static reception of assistance information by the transmitting electronic apparatus 8000 is mainly described in conjunction with the scenario of sidelink resource selection mode 2. However, those skilled in the art can understand that the following description about receiving the assistance information semi-statically is not limited to the scenario of sidelink resource selection mode 2. Instead, the description may be applied to other scenarios of receiving assistance information semi-statically in 4G or 5G or other communication modes.

For example, the predetermined information may be SCI. The SCI may include first phase SCI as control information transmitted on a control channel or second phase SCI as control information transmitted on a data channel.

For example, the predetermined information may be MAC CE.

For example, the periodic channel may be PSFCH. Receiving the assistance information reported via the PSFCH of at least one receiving electronic apparatus can realize the transmission of the assistance information on the existing communication mechanism, and there is no compatibility problem.

The prior art specifies the configuration and mapping mode of PSFCH resources, and ACK/NACK is represented by the difference of the cyclic shift of the basic sequence. In the prior art, a set of cyclic shift pairs for the sequence used to feed back the HARQ-ACK is defined: a sequence of mCS=0 indicates NACK, and a sequence of mCS=6 indicates ACK.

For example, the third information receiving unit 8003 may be configured to receive the assistance information represented by the cyclic shift of the sequence in the PSFCH used to feed back the HARQ-ACK.

For example, a second group of cyclic shift pairs of the sequence used to feed back the HARQ-ACK may be defined to represent the assistance information. The sequence of mCS=3 indicates that the time-frequency resource reserved in the SCI of the PSCCH corresponding to the current PSSCH has a collision. The sequence of mCS=9 indicates that the time-frequency reserved resources indicated in the SCI of the PSCCH corresponding to the current PSSCH are collision-free. Those skilled in the art can understand that other cyclic shift pairs can also be defined to represent the assistance information, and which are not detailed here.

For example, the third information receiving unit 8003 may be configured to receive the assistance information reflected through the reflection information added in PSFCH. The reflection information reflects whether the reserved resource of the transmitting electronic apparatus 8000 is occupied, and/or the reflection information recommends a time-frequency resource block for use by the transmitting electronic apparatus 8000 or a time-frequency resource block not for use by the transmitting electronic apparatus 8000.

For example, the reflected information can be increased by increasing the number of effective information bits of the PSFCH. For example, three binary bits may be used to respectively indicate the occupancy of three reserved resources (one resource for initial transmission and two resources for retransmission). For example, when the binary bit is "0", it indicates that the corresponding reserved resource is not occupied. When the binary bit is "1", it means that the corresponding reserved resource has been occupied, and/or, more bits can be used to directly indicate which time-frequency resources are recommended to be used or not recommended to be used by the transmitting electronic apparatus 8000.

For example, the third information receiving unit 8003 may be configured to receive the assistance information fed back through the sequence in the PSFCH used to feed back the HARQ-ACK. An indication field is added to the SCI of at least one receiving electronic apparatus to indicate that the sequence used to feed back the HARQ-ACK of the PSFCH is replaced by the sequence used to feed back the assistance information.

For example, the number of information bits of the PSFCH is not changed, only a field of one bit is added to the SCI of the receiving electronic apparatus. It indicates that the PSFCH corresponding to the PSSCH related to the PSCCH does not feed back the ACK/NACK information, but only feeds back one bit of assistance information. For example, "0" indicates that the receiving electronic apparatus has not found any collision on the reserved resources of the transmitting electronic apparatus 8000. "1" indicates that the receiving electronic apparatus finds that there is a collision on the reserved resources of the transmitting electronic apparatus 8000. The transmitting electronic apparatus 8000 may use an existing method of determining PSFCH resources to receive and decode corresponding assistance information, and select a set of candidate time-frequency resources based on the assistance information.

For example, the periodic channel may be PSFACH temporally associated with PSFCH. The period of PSFACH is the same as the period of PSFCH feeding back the HARQ-ACK. The transmitting electronic apparatus 8000 receives the assistance information reported through a specific physical sidelink feedback assistance channel, which can avoid transmission failure caused by collision of resources for transmitting the assistance information.

For example, PSFACH can be implemented by an OFDM symbol immediately before PSFCH.

For an example of the PSFACH, reference may be made to the descriptions in conjunction with FIGS. 4 and 5, which will not be described in detail here.

For example, the third requesting unit 8001 may be configured to instruct, through the SCI, at least one receiving electronic apparatus to report the assistance information through the PSFACH.

Corresponding to the above-mentioned transmitting electronic apparatus 8000, a receiving electronic apparatus 9000 for wireless communication is also provided according to the present disclosure.

Figure 9:
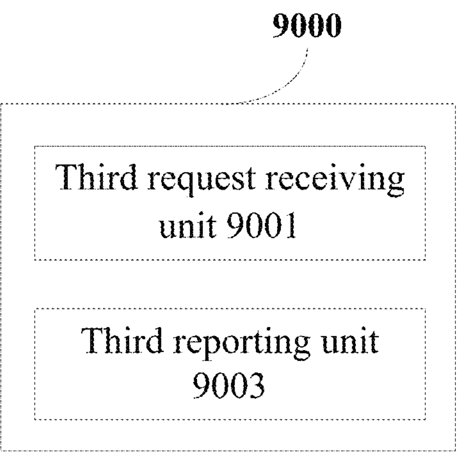
FIG. 9 is a schematic diagram showing functional modules of a receiving electronic apparatus for wireless communication according to yet another embodiment of the present disclosure.

FIG. 9 shows a block diagram of functional modules of a receiving electronic apparatus 9000 for wireless communication according to yet another embodiment of the present disclosure. As shown in FIG. 9, the receiving electronic apparatus 9000 includes a third request receiving unit 9001 and a third reporting unit 9003. The third request receiving unit 9001 is configured to receive, by predetermined information of at least one transmitting electronic apparatus of transmitting electronic apparatuses in communication with the receiving electronic apparatus, an indication which requests to report assistance information for assisting the at least one transmitting electronic apparatus to perceive time-frequency resource block(s) in a manner of event trigger. The third reporting unit 9003 is configured to report the assistance information to the at least one transmitting electronic apparatus via a periodic channel.

The third request receiving unit 9001 and the third reporting unit 9003 may be implemented by one or more processing circuitries which may be implemented as, for example, a chip.

The receiving electronic apparatus 9000 may be arranged on user equipment (UE) side or communicably connected to a UE, for example. It should also be noted herein that, the receiving electronic apparatus 9000 may be implemented at chip level or at apparatus level. For example, the receiving electronic apparatus 9000 may work as user equipment itself, and may also include external devices such as a memory, a transceiver (not shown in the drawings) and the like. The memory may be configured to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be, for example, an eNB or a gNB.

A transmitting electronic apparatus corresponding to the receiving electronic apparatus 9000 may be, for example, the transmitting electronic apparatus 8000 described above.

For example, the event may be the arrival of a data packet at the transmitting electronic apparatus. For example, the event may be that the transmitting electronic apparatus receives a request for allocating time-frequency resource blocks for other electronic apparatuses. Those skilled in the art can also think of other examples of events, which are not detailed here.

The assistance information reported by the receiving electronic apparatus 9000 may help the transmitting electronic apparatus to select a set of candidate time-frequency resources more accurately, thereby avoiding hidden node problems, exposed node problems, and half-duplex problems. In addition, by receiving the request and periodically configuring resources for transmitting the assistance information to report the assistance information semi-statically when an event occurs, resource collisions in transmission of the assistance information can be reduced and excessive transmission of the assistance information can be reduced.

For example, the third reporting unit 9003 may be configured to report the assistance information in a scenario of sidelink resource selection mode 2.

In the following, the semi-static reporting of assistance information by the receiving electronic apparatus 9000 is mainly described in conjunction with the scenario of sidelink resource selection mode 2. However, those skilled in the art can understand that the following description about semi-static reporting of assistance information is not limited to the scenario of sidelink resource selection mode 2. Instead, the description can be applied to other scenarios of semi-static reporting of assistance information in 4G or 5G or other communication modes.

For example, the predetermined information may be SCI. The SCI may include first phase SCI as control information transmitted on a control channel or second phase SCI as control information transmitted on a data channel.

For example, the predetermined information may be MAC CE.

For example, the periodic channel may be PSFCH. By reporting the assistance information through the PSFCH, the transmission of the assistance information can be realized on the existing communication mechanism, and there is no compatibility problem.

For example, the third reporting unit 9003 may be configured to report the assistance information through the cyclic shift of the sequence used to feed back the HARQ-ACK in the PSFCH.

For example, the second group of cyclic shift pairs (the sequence of mCS=3 and the sequence of mCS=9) mentioned above for feeding back the HARQ-ACK sequence may be defined to represent the assistance information. Those skilled in the art can understand that other cyclic shift pairs can also be defined to represent assistance information, which will not be detailed here.

For example, the third reporting unit 9003 may be configured to report the assistance information through reflection information added in PSFCH. The reflection information reflects whether the reserved resource of at least one transmitting electronic apparatus is occupied, and/or the reflection information is used to recommend time-frequency resource blocks used by at least one transmitting electronic apparatus or time-frequency resource blocks not recommended to be used by at least one transmitting electronic apparatus.

For example, as mentioned in the embodiment of the transmitting electronic apparatus 8000, the reflected information can be increased by increasing the number of effective information bits of the PSFCH.

For example, the third reporting unit 9003 may be configured to report the assistance information through the sequence in the PSFCH used to feed back the HARQ-ACK. An indication field is added to the sidelink control information SCI of the receiving electronic apparatus to indicate that the sequence used to feed back the HARQ-ACK of the PSFCH is replaced by the sequence used to feed back the assistance information.

For example, without changing the number of information bits of the PSFCH, only by adding a one-bit field in the SCI of the receiving electronic apparatus 9000, it indicates that the PSFCH corresponding to the PSSCH related to the PSCCH does not feed back ACK/NACK information, but only feeds back one bit of the assistance information. For example, “0” indicates that the receiving electronic apparatus has not found any collision on the reserved resources of the transmitting electronic apparatus. “1” indicates that the receiving electronic apparatus finds that there is a collision on the reserved resources of the transmitting electronic apparatus.

For example, the periodic channel is PSFACH which is temporally associated with PSFCH. The period of PSFACH is the same as the period of PSFCH feeding back the HARQ-ACK. By reporting the assistance information through a specific physical sidelink feedback assistance channel, transmission failure caused by collision of resources for transmitting the assistance information can be avoided.

For example, PSFACH is realized by an OFDM symbol immediately before PSFCH.

For an example of the PSFACH, reference may be made to the descriptions in conjunction with FIGS. 4 and 5, which will not be described in detail here.

The compatibility problem between the electronic apparatus of Rel-16 NR sidelink communication and the electronic apparatus of Rel-17 NR sidelink communication can be solved by using the first phase SCI reserved bits. In first phase SCI, 1 of the reserved bits is used to distinguish R-16 from R-17 electronic equipment. If the value of this reserved bit is 0, it indicates that the electronic apparatus is an R-16 electronic apparatus. If the reserved bit is 1, it indicates that the electronic apparatus is an R-17 electronic apparatus. When both the transmitting electronic apparatus and the receiving electronic apparatus are R-17 electronic apparatuses, the above dynamic, periodic and semi-static assistance information transmission resource determination mechanism according to the embodiments of the present disclosure may be implemented. It is also possible to use RRC signaling to interact whether an electronic apparatus is R-16 electronic apparatus or R-17 electronic apparatus when the transmitting electronic apparatus and the receiving electronic apparatus establish a PC5-RRC link.

In the process of describing the electronic apparatuses for wireless communication in the above implementations, some processing or methods obviously have also been disclosed. Hereinafter, an outline of these methods will be given without repeating some of the details that have been discussed above. However, it should be noted that, although these methods are disclosed in the process of describing electronic apparatuses for wireless communication, these methods do not necessarily employ those components as described or are not necessarily executed by those components. For example, the implementations of the electronic apparatuses for wireless communication may be partially or completely realized using hardware and/or firmware, while the methods for wireless communication discussed below may be completely implemented by a computer-executable program, although these methods may also employ hardware and/or firmware of the electronic apparatuses for wireless communication.

Figure 10:
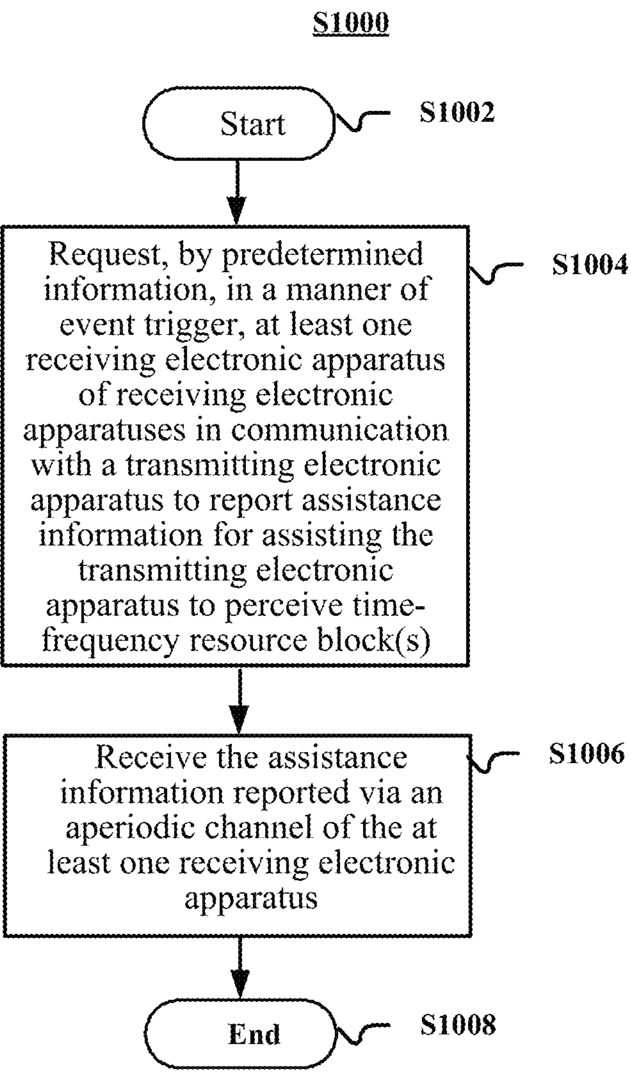
FIG. 10 is a flowchart showing a method for wireless communication according to an embodiment of the present disclosure.

FIG. 10 is a flowchart showing a method S1000 for wireless communication according to an embodiment of the present disclosure. The method S1000 starts at step S1002. In step S1004, at least one receiving electronic apparatus of receiving electronic apparatuses in communication with the transmitting electronic apparatus is requested, by predetermined information, in a manner of event trigger, to report assistance information for assisting the transmitting electronic apparatus to perceive time-frequency resource block(s). In step S1006, assistance information reported via at least one aperiodic channel of the at least one receiving electronic apparatus is received. The method S1000 ends in step S1008.

The method S1000 may be performed by the transmitting electronic apparatus 100, for example. For specific details of the method S1000, reference may be made to the description of corresponding positions in the above embodiment of the transmitting electronic apparatus 100, which will not be repeated here.

Figure 11:
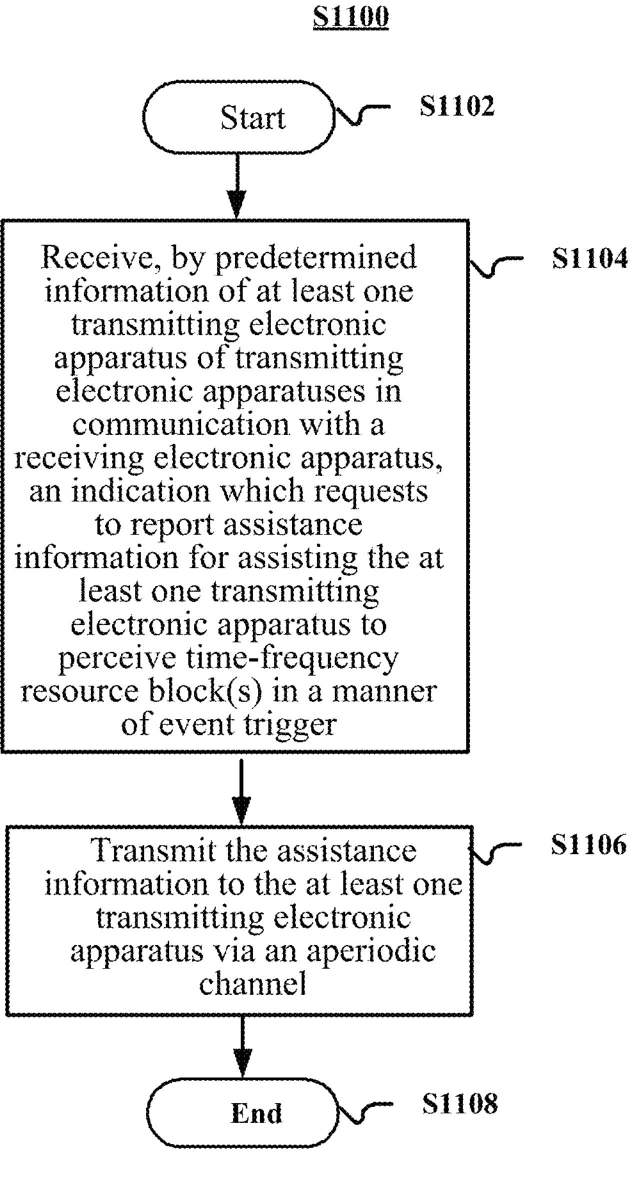
FIG. 11 is a flowchart showing a method for wireless communication according to an embodiment of the present disclosure.

FIG. 11 shows a flowchart of a method S1100 for wireless communication according to an embodiment of the present disclosure. The method S1100 starts at step S1102. In step S1104, an indication which requests to report assistance information for assisting the at least one transmitting electronic apparatus to perceive time-frequency resource block(s) in a manner of event trigger is received by predetermined information of at least one transmitting electronic apparatus of transmitting electronic apparatuses in communication with the receiving electronic apparatus. In step S1106, assistance information is reported to at least one transmitting electronic apparatus via an aperiodic channel. The method S1100 ends in step S1108.

The method S1100 may be performed by the receiving electronic apparatus 200, for example. For specific details of the method S1100, reference may be made to the above description of the corresponding position in the embodiment of the receiving electronic apparatus 200, which will not be repeated here.

Figures 12, 13:
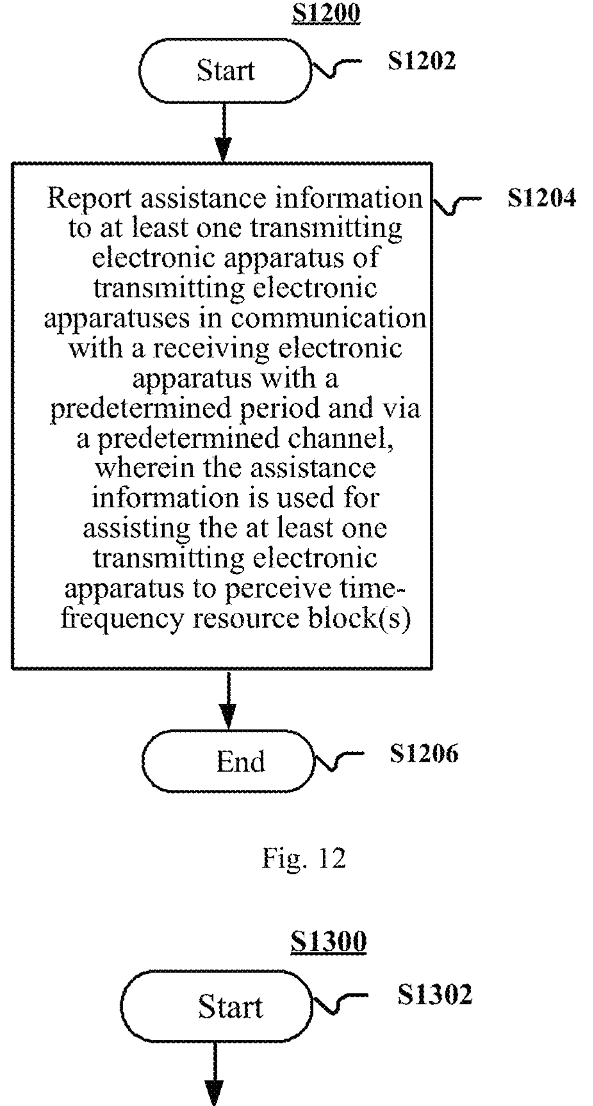
FIG. 12 is a flowchart showing a method for wireless communication according to another embodiment of the present disclosure.
FIG. 13 is a flowchart showing a method for wireless communication according to another embodiment of the present disclosure.

FIG. 12 shows a flowchart of a method S1200 for wireless communication according to another embodiment of the present disclosure. The method S1200 starts at step S1202. In step S1204, assistance information is reported to at least one transmitting electronic apparatus of transmitting electronic apparatuses in communication with the receiving electronic apparatus with a predetermined period and via a predetermined channel, wherein the assistance information is used for assisting the at least one transmitting electronic apparatus to perceive time-frequency resource block(s). The method S1200 ends in step S1206.

The method S1200 may be performed by the receiving electronic apparatus 300, for example. For specific details of the method S1200, reference may be made to the description of the corresponding position in the embodiment of the receiving electronic apparatus 300 above, and will not be repeated here.

FIG. 13 shows a flowchart of a method S1300 for wireless communication according to another embodiment of the present disclosure. The method S1300 starts at step S1302. In step S1304, assistance information reported by at least one receiving electronic apparatus communicating with the transmitting electronic apparatus at a predetermined period through a predetermined channel is received, wherein the assistance information is used to assist the transmitting electronic apparatus to perceive the time-frequency resource block. The method S1300 ends in step S1306.

The method S1300 may be performed, for example, by the transmitting electronic apparatus 700. For specific details of the method S1300, reference may be made to the description of the corresponding position in the above embodiment of the transmitting electronic apparatus 130, which will not be repeated here.

Figure 14:
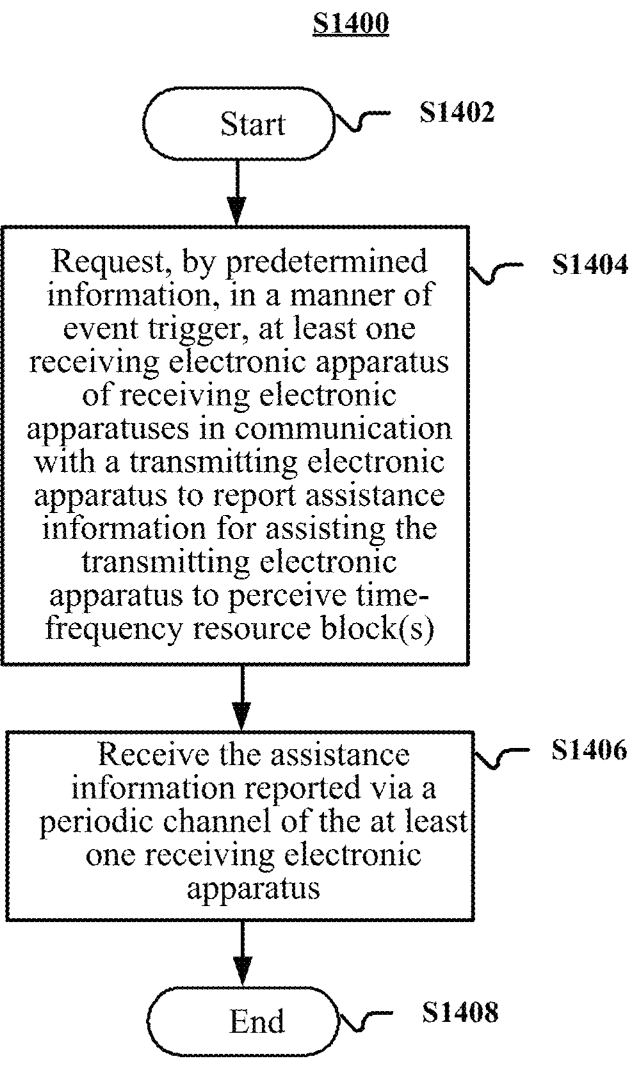
FIG. 14 is a flowchart showing a method for wireless communication according to yet another embodiment of the present disclosure.

FIG. 14 shows a flowchart of a method S1400 for wireless communication according to yet another embodiment of the present disclosure. The method S1400 starts at step S1402. In step S1404, at least one receiving electronic apparatus of receiving electronic apparatuses in communication with the transmitting electronic apparatus is requested, by predetermined information, in a manner of event trigger, to report assistance information for assisting the transmitting electronic apparatus to perceive time-frequency resource block(s). In step S1406, assistance information reported via periodic channel of the at least one receiving electronic apparatus is received. The method S1400 ends in step S1408.

The method S1400 may be performed by the transmitting electronic apparatus 8000, for example. For specific details of the method S1400, refer to the description of the corresponding position in the above embodiment of the transmitting electronic apparatus 8000, which will not be repeated here.

Figure 15:
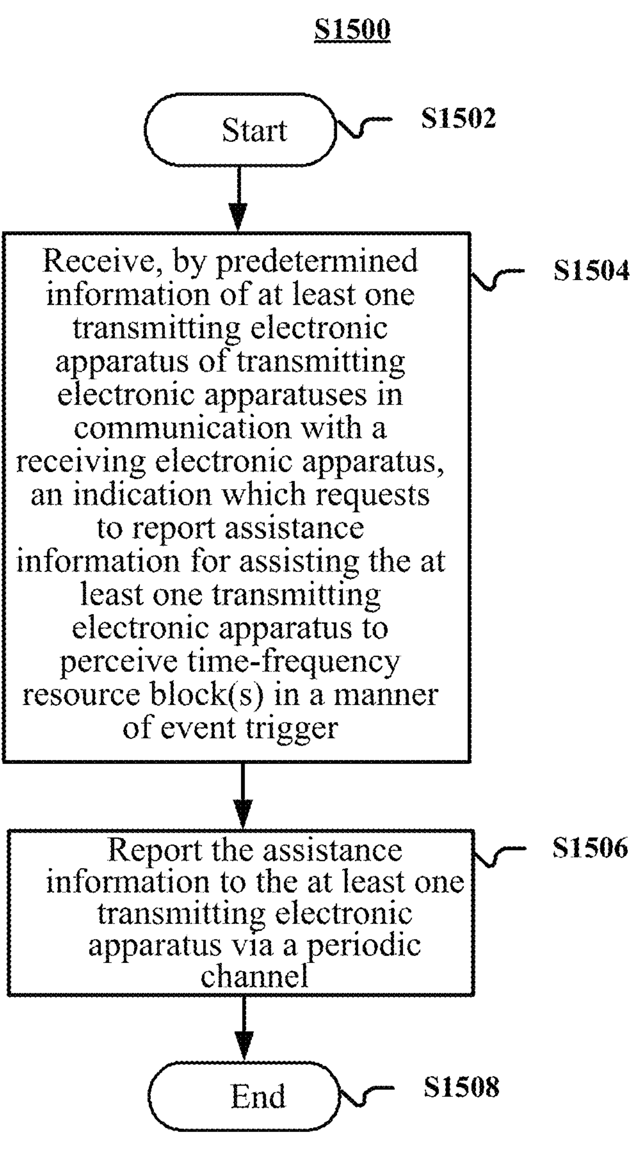
FIG. 15 is a flowchart showing a method for wireless communication according to yet another embodiment of the present disclosure.

FIG. 15 shows a flowchart of a method S1500 for wireless communication according to another embodiment of the present disclosure. The method S1500 starts at step S1502. In step S1504, an indication which requests to report assistance information for assisting the at least one transmitting electronic apparatus to perceive time-frequency resource block(s) in a manner of event trigger is received, by predetermined information of at least one transmitting electronic apparatus of transmitting electronic apparatuses in communication with the receiving electronic apparatus. In step S1506, assistance information is reported to at least one transmitting electronic apparatus via a periodic channel. The method S1500 ends in step S1508.

The method S1500 may be performed by the receiving electronic apparatus 9000, for example. For specific details of the method S1500, reference may be made to the description of the corresponding position in the above embodiment of the receiving electronic apparatus 9000, which will not be repeated here.

The technology of the present disclosure can be applied to various products.

For example, the transmitting electronic apparatuses 100, 700 and 8000 as well as the receiving electronic apparatus 200, 300 and 9000 may be implemented as various user equipment. The user equipment may be implemented as a mobile terminal (such as a smart phone, a tablet personal computer (PC), a notebook PC, a portable game terminal, a portable/dongle type mobile router, and a digital camera), or a vehicle terminal (such as an automobile navigation equipment). The user equipment may also be implemented as a terminal performing machine-to-machine (M2M) communication (also referred to as a machine type communication (MTC) terminal). In addition, the user equipment may be a wireless communication module (such as an integrated circuit module including a single chip) mounted on each of the terminals.

Application Examples about Base Station

First Application Example

Figure 16:
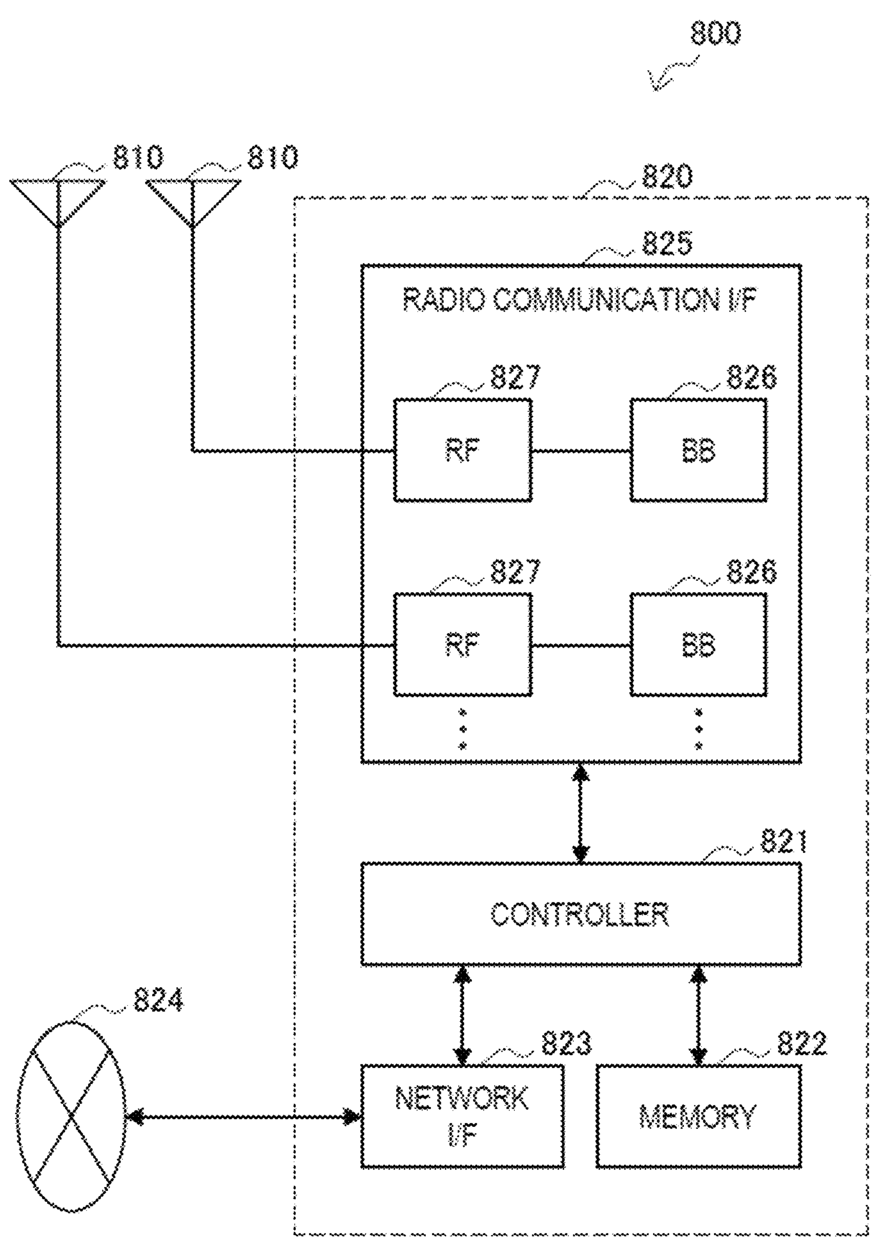
FIG. 16 is a block diagram showing a first example of a schematic configuration of an eNB or gNB to which the technology of the present disclosure can be applied.

FIG. 16 is a block diagram showing a first example of a schematic configuration of an eNB or gNB to which the technology of the present disclosure can be applied. Note that, the following description takes an eNB as an example, but it may also be applied to a gNB. An eNB 800 includes one or more antennas 810 and base station equipment 820. The base station equipment 820 and each antenna 810 may be connected to each other via an RF cable.

Each of the antennas 810 includes a single or multiple antenna elements (such as multiple antenna elements included in a Multi-Input Multi-Output (MIMO) antenna), and is used for the base station equipment 820 to transmit and receive wireless signals. As shown in FIG. 16, the eNB 800 may include multiple antennas 810. For example, the multiple antennas 810 may be compatible with multiple frequency bands used by the eNB 800. Although FIG. 16 shows an example in which the eNB 800 includes multiple antennas 810, the eNB 800 may also include a single antenna 810.

The base station equipment 820 includes a controller 821, a memory 822, a network interface 823, and a radio communication interface 825.

The controller 821 may be, for example, a CPU or a DSP, and manipulate various functions of a higher layer of the base station equipment 820. For example, the controller 821 generates a data packet based on data in a signal processed by the radio communication interface 825, and transfers the generated packet via the network interface 823. The controller 821 may bundle data from multiple baseband processors to generate a bundled packet, and transfer the generated bundled packet. The controller 821 may have a logical function for performing control such as radio resource control, radio bearer control, mobility management, admission control, and scheduling. The control may be executed in conjunction with nearby eNBs or core network nodes. The memory 822 includes a RAM and a ROM, and stores programs executed by the controller 821 and various types of control data (such as a terminal list, transmission power data, and scheduling data).

The network interface 823 is a communication interface for connecting the base station equipment 820 to a core network 824. The controller 821 may communicate with the core network node or another eNB via the network interface 823. In this case, the eNB 800 and the core network node or other eNBs may be connected to each other through a logical interface (such as an S1 interface and an X2 interface). The network interface 823 may also be a wired communication interface, or a wireless communication interface for a wireless backhaul line. If the network interface 823 is a wireless communication interface, the network interface 823 may use a higher frequency band for wireless communications than the frequency band used by the radio communication interface 825.

The radio communication interface 825 supports any cellular communication scheme (such as Long Term Evolution (LTE) and LTE-Advanced), and provides wireless connection to a terminal located in a cell of the eNB 800 via an antenna 810. The radio communication interface 825 may generally include, for example, a baseband (BB) processor 826 and an RF circuit 827. The BB processor 826 may execute, for example, encoding/decoding, modulation/demodulation, and multiplexing/demultiplexing, and execute various types of signal processing of layers (e.g., LI, Medium Access Control (MAC), Radio Link Control (RLC), and Packet Data Convergence Protocol (PDCP)). Instead of the controller 821, the BB processor 826 may have a part or all of the above-mentioned logical functions. The BB processor 826 may be a memory storing a communication control program, or a module including a processor and related circuits configured to execute the program. An update program may cause the function of the BB processor 826 to be changed. The module may be a card or blade inserted into a slot of the base station equipment 820. Alternatively, the module may also be a chip mounted on a card or blade. Meanwhile, the RF circuit 827 may include, for example, a mixer, a filter, and an amplifier, and transmit and receive a wireless signal via the antenna 810.

As shown in FIG. 16, the radio communication interface 825 may include multiple BB processors 826. For example, the multiple BB processors 826 may be compatible with multiple frequency bands used by the eNB 800. As shown in FIG. 16, the radio communication interface 825 may include multiple RF circuits 827. For example, the multiple RF circuits 827 may be compatible with multiple antenna elements. Although FIG. 16 shows an example in which the radio communication interface 825 includes multiple BB processors 826 and multiple RF circuits 827, the radio communication interface 825 may also include a single BB processor 826 or a single RF circuit 827.

In the eNB 800 as shown in FIG. 16, the transceiver may be implemented by a radio communication interface 825. At least a part of the function may also be implemented by the controller 821.

Second Application Example

Figure 17:
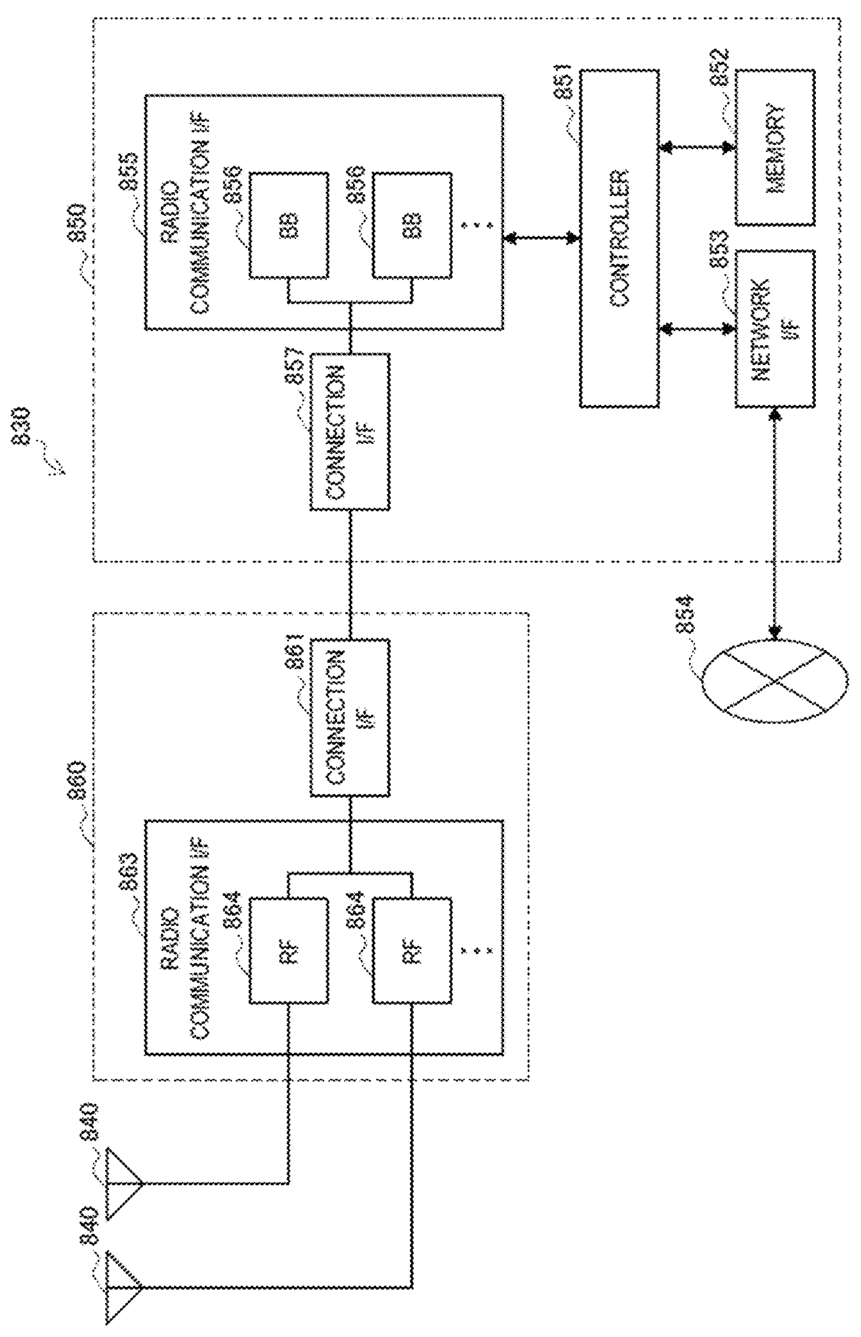
FIG. 17 is a block diagram showing a second example of a schematic configuration of an eNB or gNB to which the technology of the present disclosure can be applied.

FIG. 17 is a block diagram showing a second example of a schematic configuration of an eNB or gNB to which the technology of the present disclosure can be applied. Note that similarly, the following description takes an eNB as an example, but it may also be applied to a gNB. An eNB 830 includes one or more antennas 840, base station equipment 850, and an RRH 860. The RRH 860 and each antenna 840 may be connected to each other via an RF cable. The base station equipment 850 and the RRH 860 may be connected to each other via a high-speed line such as an optical fiber cable.

Each of the antennas 840 includes a single or multiple antenna elements (such as multiple antenna elements included in a MIMO antenna) and is used for the RRH 860 to transmit and receive a wireless signal. As shown in FIG. 17, the eNB 830 may include multiple antennas 840. For example, the multiple antennas 840 may be compatible with multiple frequency bands used by the eNB 830. Although FIG. 17 shows an example in which the eNB 830 includes multiple antennas 840, the eNB 830 may also include a single antenna 840.

The base station equipment 850 includes a controller 851, a memory 852, a network interface (I/F) 853, a radio communication interface 855, and a connection interface 857. The controller 851, the memory 852, and the network interface 853 are the same as the controller 821, the memory 822, and the network interface 823 as described with reference to FIG. 17.

The radio communication interface 855 supports any cellular communication scheme (such as LTE and LTE-Advanced), and provides wireless communications to a terminal located in a sector corresponding to the RRH 860 via the RRH 860 and the antenna 840. The radio communication interface 855 may generally include, for example, a BB processor 856. The BB processor 856 is the same as the BB processor 826 as described with reference to FIG. 16 except that the BB processor 856 is connected to the RF circuit 864 of the RRH 860 via the connection interface 857. As shown in FIG. 17, the radio communication interface 855 may include multiple BB processors 856. For example, the multiple BB processors 856 may be compatible with multiple frequency bands used by the eNB 830. Although FIG. 17 shows an example in which the radio communication interface 855 includes multiple BB processors 856, the radio communication interface 855 may also include a single BB processor 856.

The connection interface 857 is an interface for connecting the base station equipment 850 (radio communication interface 855) to the RRH 860. The connection interface 857 may also be a communication module for communication in the above-mentioned high-speed line that connects the RRH 860 to the base station equipment 850 (radio communication interface 855).

The RRH 860 includes a connection interface 861 and a radio communication interface 863.

The connection interface 861 is an interface for connecting the RRH 860 (radio communication interface 863) to the base station equipment 850. The connection interface 861 may also be a communication module for communication in the above-mentioned high-speed line.

The radio communication interface 863 transfers and receives wireless signals via the antenna 840. The radio communication interface 863 may generally include, for example, an RF circuit 864. The RF circuit 864 may include, for example, a mixer, a filter, and an amplifier, and transfer and receive wireless signals via the antenna 840. As shown in FIG. 17, the radio communication interface 863 may include multiple RF circuits 864. For example, the multiple RF circuits 864 may support multiple antenna elements. Although FIG. 17 shows an example in which the radio communication interface 863 includes multiple RF circuits 864, the radio communication interface 863 may also include a single RF circuit 864.

In the eNB 830 as shown in FIG. 17, the transceiver may be implemented by the radio communication interface 825. At least a part of the function may also be implemented by the controller 821.

Application Example about User Equipment

First Application Example

Figure 18:
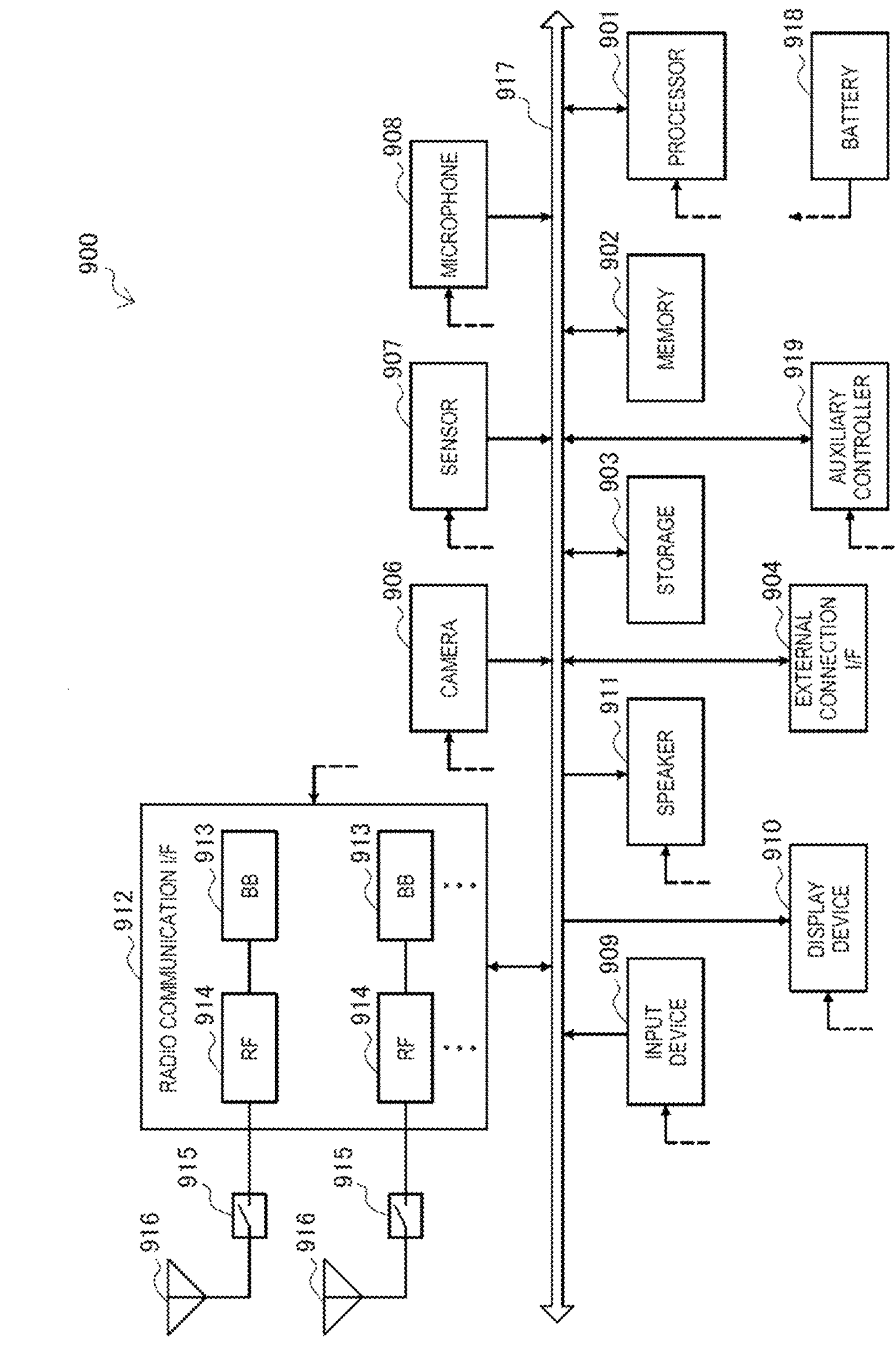
FIG. 18 is a block diagram showing an example of a schematic configuration of a smart phone to which the technology of the present disclosure can be applied.

FIG. 18 is a block diagram showing an example of a schematic configuration of a smart phone to which the technology of the present disclosure can be applied. The smart phone 900 includes a processor 901, a memory 902, a storage 903, an external connection interface 904, an camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls the functions of the application layer and other layers of the smart phone 900. The memory 902 includes a RAM and a ROM, and stores data and programs executed by the processor 901. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetic sensor, and an acceleration sensor. The microphone 908 converts sound input to the smart phone 900 into an audio signal. The input device 909 includes, for example, a touch sensor, a keypad, a keyboard, a button, or a switch configured to detect a touch on a screen of the display device 910, and receives an operation or information input from the user. The display device 910 includes a screen (such as a liquid crystal display (LCD) and an organic light emitting diode (OLED) display), and displays an output image of the smart phone 900. The speaker 911 converts the audio signal output from the smart phone 900 into sound.

The radio communication interface 912 supports any cellular communication scheme (such as LTE and LTE-Advanced), and executes wireless communications. The radio communication interface 912 may generally include, for example, a BB processor 913 and an RF circuit 914. The BB processor 913 may execute, for example, encoding/decoding, modulation/demodulation, and multiplexing/demultiplexing, and execute various types of signal processing for wireless communications. Meanwhile, the RF circuit 914 may include, for example, a mixer, a filter, and an amplifier, and transmit and receive wireless signals via the antenna 916. Note that, although the figure shows a circumstance where one RF link is connected with one antenna, this is only schematic, and a circumstance where one RF link is connected with multiple antennas through multiple phase shifters is also included. The radio communication interface 912 may be a chip module on which the BB processor 913 and the RF circuit 914 are integrated. As shown in FIG. 18, the radio communication interface 912 may include multiple BB processors 913 and multiple RF circuits 914. Although FIG. 18 shows an example in which the radio communication interface 912 includes multiple BB processors 913 and multiple RF circuits 914, the radio communication interface 912 may also include a single BB processor 913 or a single RF circuit 914.

Furthermore, in addition to the cellular communication scheme, the radio communication interface 912 may support other types of wireless communication schemes, such as a short-range wireless communication scheme, a near field communication scheme, and a wireless local area network (LAN) scheme. In this case, the radio communication interface 912 may include a BB processor 913 and an RF circuit 914 for each wireless communication scheme.

Each of the antenna switches 915 switches a connection destination of the antenna 916 among multiple circuits included in the radio communication interface 912 (e.g., circuits for different wireless communication schemes).

Each of the antennas 916 includes a single or multiple antenna elements (such as multiple antenna elements included in a MIMO antenna), and is used for the radio communication interface 912 to transmit and receive wireless signals. As shown in FIG. 18, the smart phone 900 may include multiple antennas 916. Although FIG. 18 shows an example in which the smart phone 900 includes multiple antennas 916, the smart phone 900 may also include a single antenna 916.

Furthermore, the smart phone 900 may include an antenna 916 for each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to each block of the smart phone 900 as shown in FIG. 18 via a feeder line, which is partially shown as a dashed line in the figure. The auxiliary controller 919 manipulates the least necessary function of the smart phone 900 in a sleep mode, for example.

In the smart phone 900 as shown in FIG. 18, when the transmitting electronic apparatus and the receiving electronic apparatus according to the embodiments of the present disclosure are implemented as user equipment, the transceivers of the transmitting electronic apparatus and the receiving electronic apparatus may be implemented by the radio communication interface 912. At least a part of the function may also be implemented by the processor 901 or the auxiliary controller 919. For example, the processor 901 or the auxiliary controller 919 may transmit assistance information.

Second Application Example

Figure 19:
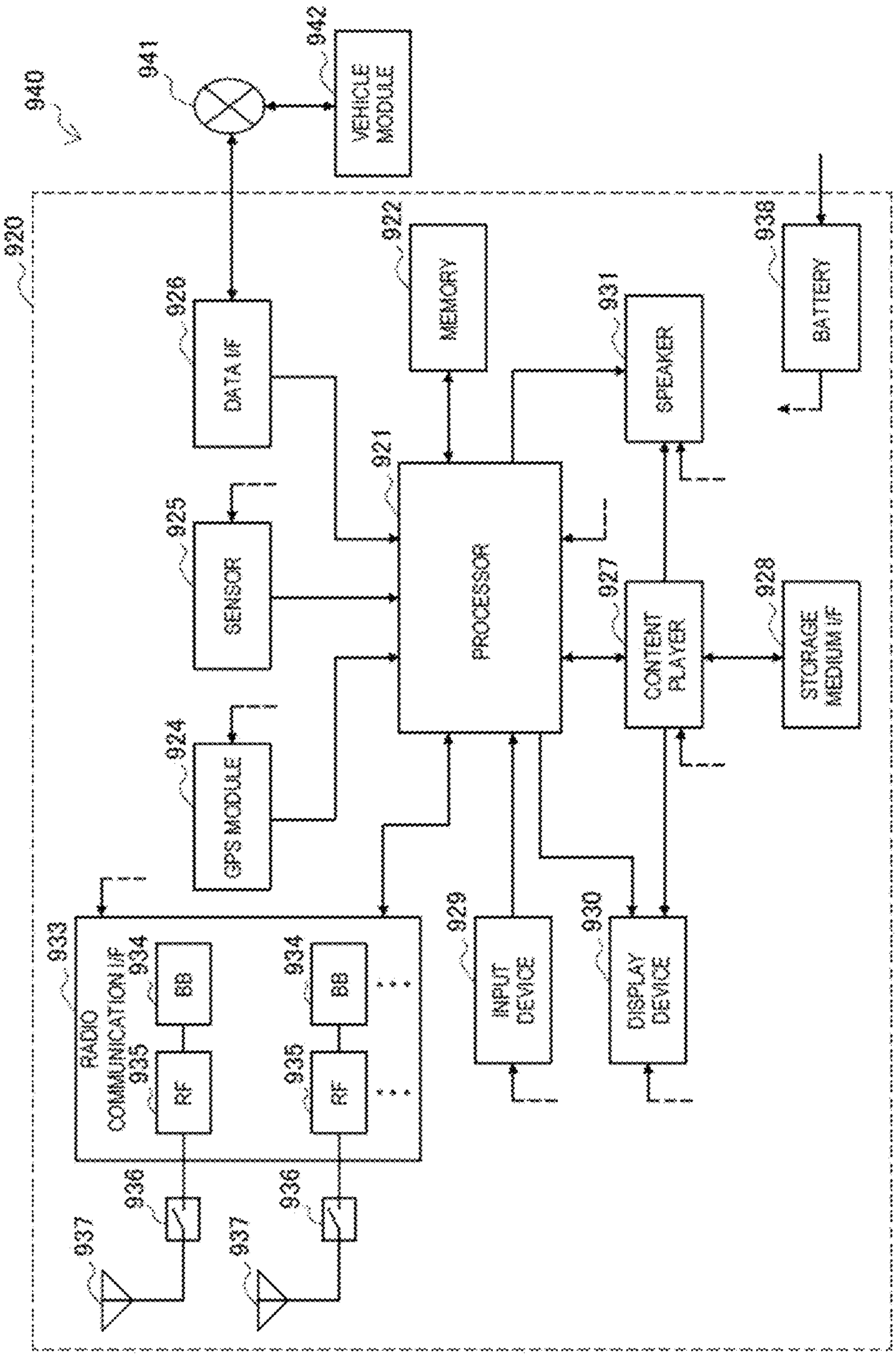
FIG. 19 is a block diagram showing an example of a schematic configuration of automobile navigation equipment to which the technology of the present disclosure can be applied.

FIG. 19 is a block diagram showing an example of a schematic configuration of automobile navigation equipment to which the technology of the present disclosure can be applied. The automobile navigation equipment 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function of the automobile navigation equipment 920 and additional functions. The memory 922 includes a RAM and a ROM, and stores data and programs executed by the processor 921.

The GPS module 924 uses a GPS signal received from a GPS satellite to measure a position of the automobile navigation equipment 920 (such as latitude, longitude, and altitude). The sensor 925 may include a group of sensors, such as a gyro sensor, a geomagnetic sensor, and an air pressure sensor. The data interface 926 is connected to, for example, an in-vehicle network 941 via a terminal not shown, and acquires data (such as vehicle speed data) generated by a vehicle.

The content player 927 reproduces content stored in a storage medium (such as a CD and a DVD), which is inserted into the storage medium interface 928. The input device 929 includes, for example, a touch sensor, a button, or a switch configured to detect a touch on a screen of the display device 930, and receives an operation or information input from the user. The display device 930 includes a screen such as an LCD or OLED display, and displays an image of a navigation function or reproduced content. The speaker 931 outputs the sound of the navigation function or the reproduced content.

The radio communication interface 933 supports any cellular communication scheme, such as LTE and LTE-Advanced, and executes wireless communication. The radio communication interface 933 may generally include, for example, a BB processor 934 and an RF circuit 935. The BB processor 934 may execute, for example, encoding/decoding, modulation/demodulation, and multiplexing/demultiplexing, and execute various types of signal processing for wireless communications. Meanwhile, the RF circuit 935 may include, for example, a mixer, a filter, and an amplifier, and transmit and receive wireless signals via the antenna 937. The radio communication interface 933 may also be a chip module on which the BB processor 934 and the RF circuit 935 are integrated. As shown in FIG. 19, the radio communication interface 933 may include multiple BB processors 934 and multiple RF circuits 935. Although FIG. 19 shows an example in which the radio communication interface 933 includes multiple BB processors 934 and multiple circuits 935, the radio communication interface 933 may also include a single BB processor 934 or a single RF circuit 935. Furthermore, in addition to the cellular communication scheme, the radio communication interface 933 may support types of wireless communication schemes, such as a short-range wireless communication scheme, a near field communication scheme, and a wireless LAN scheme. In this case, the radio communication interface 933 may include a BB processor 934 and an RF circuit 935 for each wireless communication scheme.

Each of the antenna switches 936 switches a connection destination of the antenna 937 among multiple circuits included in the radio communication interface 933 (e.g., circuits for different wireless communication schemes).

Each of the antennas 937 includes a single or multiple antenna elements (such as multiple antenna elements included in a MIMO antenna), and is used for the radio communication interface 933 to transmit and receive wireless signals. As shown in FIG. 19, the automobile navigation equipment 920 may include multiple antennas 937. Although FIG. 19 shows an example in which the automobile navigation equipment 920 includes multiple antennas 937, the automobile navigation equipment 920 may also include a single antenna 937.

Furthermore, the automobile navigation equipment 920 may include an antenna 937 for each wireless communication scheme. In this case, the antenna switch 936 may be omitted from the configuration of the automobile navigation equipment 920.

The battery 938 supplies power to each block of the automobile navigation equipment 920 as shown in FIG. 19 via a feeder line, which is partially shown as a dashed line in the figure. The battery 938 accumulates electric power supplied from the vehicle.

In the automobile navigation equipment 920 as shown in FIG. 19, when the transmitting electronic apparatus and the receiving electronic apparatus according to the embodiments of the present disclosure are implemented as user equipment, the transceivers of the transmitting electronic apparatus and the receiving electronic apparatus may be implemented by the radio communication interface 933. At least a part of the function may also be implemented by the processor 921. For example, the processor 921 transmit assistance information.

The technology of the present disclosure may also be implemented as an in-vehicle system (or vehicle) 940 including one or more blocks in the automobile navigation equipment 920, the in-vehicle network 941, and the vehicle module 942. The vehicle module 942 generates vehicle data (such as vehicle speed, engine speed, and failure information), and outputs the generated data to the in-vehicle network 941.

The basic principle of the present invention has been described above in conjunction with specific embodiments. However, it should be pointed out that, for those skilled in the art, it could be understood that all or any step or component of the methods and devices of the present invention may be implemented in any computing device (including processors, storage media, etc.) or network of computing devices in the form of hardware, firmware, software, or a combination thereof. This can be achieved by those skilled in the art utilizing their basic circuit design knowledge or basic programming skills after reading the description of the present invention.

Moreover, the present invention also proposes a program product storing a machine-readable instruction code that, when read and executed by a machine, can execute the above-mentioned methods according to the embodiments of the present invention.

Accordingly, a storage medium for carrying the above-mentioned program product storing a machine-readable instruction code is also included in the disclosure of the present invention. The storage medium includes, but is not limited to, a floppy disk, an optical disk, a magneto-optical disk, a memory card, a memory stick, etc.

Figure 20:
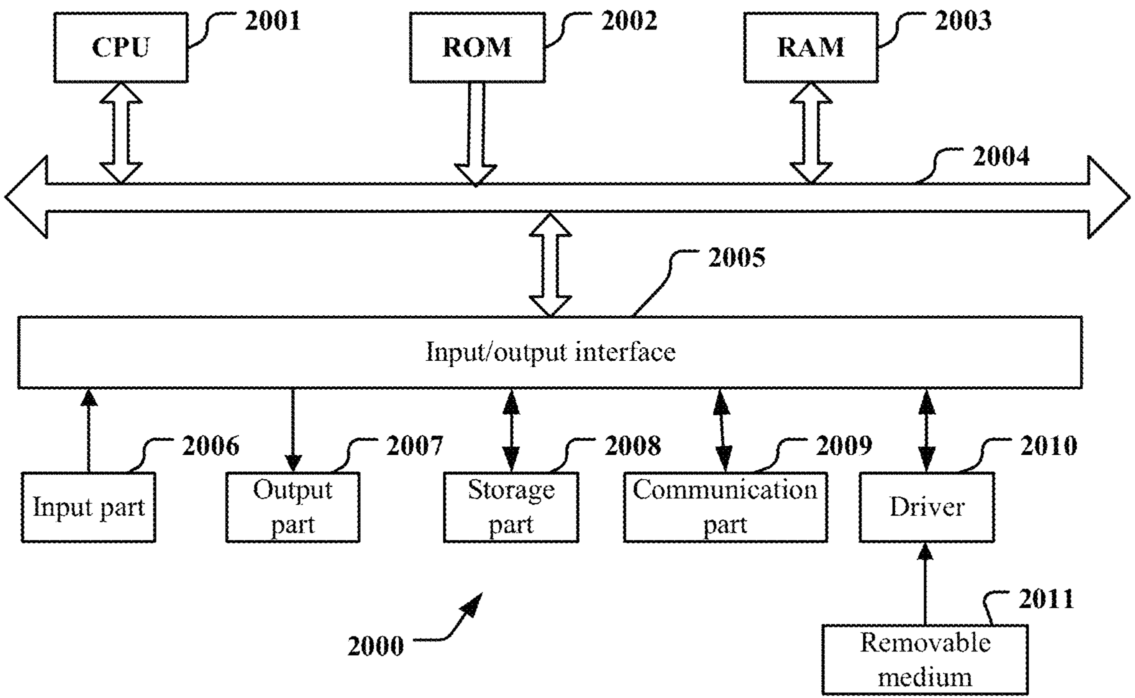
FIG. 20 is a block diagram of an exemplary structure of a universal personal computer in which the methods and/or apparatuses and/or systems according to the embodiments of the present disclosure can be implemented.

In a case where the present invention is implemented by software or firmware, a program constituting the software is installed from a storage medium or a network to a computer with a dedicated hardware structure (e.g., a general-purpose computer 2000 as shown in FIG. 20), and the computer, when installed with various programs, can execute various functions and the like.

In FIG. 20, a central processing unit (CPU) 2001 executes various processing in accordance with a program stored in a read only memory (ROM) 2002 or a program loaded from a storage part 2008 to a random access memory (RAM) 2003. In the RAM 2003, data required when the CPU 2001 executes various processing and the like is also stored as needed. The CPU 2001, the ROM 2002, and the RAM 2003 are connected to each other via a bus 2004. The input/output interface 2005 is also connected to the bus 2004.

The following components are connected to the input/output interface 2005: an input part 2006 (including a keyboard, a mouse, etc.), an output part 2007 (including a display, such as a cathode ray tube (CRT), a liquid crystal display (LCD), etc., and a speaker, etc.), a storage part 2008 (including a hard disk, etc.), and a communication part 2009 (including a network interface card such as an LAN card, a modem, etc.). The communication part 2009 executes communication processing via a network such as the Internet. The driver 2010 may also be connected to the input/output interface 2005, as needed. A removable medium 2011 such as a magnetic disk, an optical disk, a magneto-optical disk, a semiconductor memory and the like is installed on the driver 2010 as needed, so that a computer program read out therefrom is installed into the storage part 2008 as needed.

In a case where the above-mentioned series of processing is implemented by software, a program constituting the software is installed from a network such as the Internet or a storage medium such as the removable medium 2011.

Those skilled in the art should understand that, this storage medium is not limited to the removable medium 2011 as shown in FIG. 20 which has a program stored therein and which is distributed separately from an apparatus to provide the program to users. Examples of the removable media 2011 include magnetic disks (including a floppy disk (registered trademark)), an optical disk (including a compact disk read-only memory (CD-ROM) and a digital versatile disk (DVD)), a magneto-optical disk (including a mini disk (MD) (registered trademark)), and a semiconductor memory: Alternatively, the storage medium may be the ROM 2002, a hard disk included in the storage part 2008, etc., which have programs stored therein and which are distributed concurrently with the apparatus including them to users.

It should also be pointed out that in the devices, methods and systems of the present invention, each component or each step may be decomposed and/or recombined. These decompositions and/or recombinations should be regarded as equivalent solutions of the present invention. Moreover, the steps of executing the above-mentioned series of processing may naturally be executed in chronological order in the order as described, but do not necessarily need to be executed in chronological order. Some steps may be executed in parallel or independently of each other.

Finally, it should be noted that, the terms "include", "comprise" or any other variants thereof are intended to cover non-exclusive inclusion, so that a process, method, article or apparatus that includes a series of elements not only includes those elements, but also includes other elements that are not explicitly listed, or but also includes elements inherent to such a process, method, article, or apparatus. Furthermore, in the absence of more restrictions, an element defined by sentence "including one . . . " does not exclude the existence of other identical elements in a process, method, article, or apparatus that includes the element.

Although the embodiments of the present invention have been described above in detail in conjunction with the accompanying drawings, it should be appreciated that, the above-described embodiments are only used to illustrate the present invention and do not constitute a limitation to the present invention. For those skilled in the art, various modifications and changes may be made to the above-mentioned embodiments without departing from the essence and scope of the present invention. Therefore, the scope of the present invention is defined only by the appended claims and equivalent meanings thereof.

This technology can also be implemented as follows.

Note 1. A transmitting electronic apparatus for wireless communication, comprising processing circuitry configured to:

request by predetermined information, in a manner of event trigger, at least one receiving electronic apparatus of receiving electronic apparatuses in communication with the transmitting electronic apparatus to report assistance information for assisting the transmitting electronic apparatus to perceive time-frequency resource block(s), and receive the assistance information reported via an aperiodic channel of the at least one receiving electronic apparatus.

Note 2. The transmitting electronic apparatus according to Note 1, wherein the predetermined information is sidelink control information, SCI, and the SCI comprises a first phase SCI as control information transmitted on a control channel or a second phase SCI as control information transmitted on a data channel.

Note 3. The transmitting electronic apparatus according to Note 2, wherein the aperiodic channel is a second phase SCI.

Note 4. The transmitting electronic apparatus according to Note 1, wherein the predetermined information is a medium access control element, MAC CE.

Note 5. The transmitting electronic apparatus according to Note 4, wherein the aperiodic channel is a physical sidelink shared channel, PSSCH.

Note 6. The transmitting electronic apparatus according to any one of Notes 1 to 5, wherein the processing circuitry is configured to send the request through an assistance request field comprised in the predetermined information.

Note 7. The transmitting electronic apparatus according to Note 6, wherein the processing circuitry is configured to receive reflection information based on an assistance request field in the predetermined information fed back from the at least one receiving electronic apparatus, wherein the reflection information is used to reflect whether the time-frequency resource block involved in the assistance information is a time-frequency resource block recommended for use by the transmitting electronic apparatus or a time-frequency resource block not recommended for use by the transmitting electronic apparatus.

Note 8. The transmitting electronic apparatus according to any one of Notes 1 to 7, wherein the processing circuitry is configured to further send data packet information related to a data packet of the transmitting electronic apparatus to the at least one receiving electronic apparatus.

Note 9. The transmitting electronic apparatus according to Note 8, wherein the data packet information comprises a priority and/or a packet delay budget of the data packet.

Note 10. The transmitting electronic apparatus according to any one of Notes 1 to 9, wherein the processing circuitry is further configured to receive from the at least one receiving electronic apparatus a perception type of the at least one receiving electronic apparatus for the time-frequency resource block and/or discontinuous reception, DRX, configuration, wherein the perception type comprises full perception in which perception is performed throughout the entire period of time, partial perception in which perception is performed only on a part of the entire period, and random selection of time-frequency resource block without perception.

Note 11. The transmitting electronic apparatus according to any one of Notes 1 to 10, wherein the processing circuitry is configured to receive the assistance information in a scenario of sidelink resource selection mode 2.

Note 12. A receiving electronic apparatus for wireless communication, comprising processing circuitry configured to:

receive, by predetermined information of at least one transmitting electronic apparatus of transmitting electronic apparatuses in communication with the receiving electronic apparatus, an indication which requests to report assistance information for assisting the at least one transmitting electronic apparatus to perceive time-frequency resource block(s) in a manner of event trigger, and transmit the assistance information to the at least one transmitting electronic apparatus via an aperiodic channel.

Note 13. The receiving electronic apparatus according to Note 12, wherein the predetermined information is sidelink control information, SCI, and the SCI comprises a first phase SCI as control information transmitted on a control channel or a second phase SCI as control information transmitted on a data channel.

Note 14. The receiving electronic apparatus according to Note 13, wherein the aperiodic channel is a second phase SCI.

Note 15. The receiving electronic apparatus according to Note 12, wherein the predetermined information is a medium access control element, MAC CE.

Note 16. The receiving electronic apparatus according to Note 15, wherein the aperiodic channel is a physical sidelink shared channel, PSSCH.

Note 17. The receiving electronic apparatus according to any one of Notes 12 to 16, wherein the processing circuitry is configured to receive the request through an assistance request field comprised in the predetermined information.

Note 18. The receiving electronic apparatus according to Note 17, wherein the processing circuitry is configured to feed back reflection information based on an assistance request field in the predetermined information, wherein the reflection information is used to reflect whether the time-frequency resource block involved in the assistance information is a time-frequency resource block recommended for use by the at least one transmitting electronic apparatus or a time-frequency resource block not recommended for use by the at least one transmitting electronic apparatus.

Note 19. The receiving electronic apparatus according to any one of Notes 12 to 18, wherein the processing circuitry is configured to further receive data packet information related to a data packet of the at least one transmitting electronic apparatus from the at least one transmitting electronic apparatus.

Note 20. The receiving electronic apparatus according to Note 19, wherein the data packet information comprises a priority and/or a packet delay budget of the data packet.

Note 21. The receiving electronic apparatus according to any one of Notes 12 to 20, wherein the processing circuitry is further configured to report a perception type of the receiving electronic apparatus for the time-frequency resource block and/or a discontinuous reception DRX configuration to the at least one transmitting electronic apparatus, wherein the perception type comprises full perception in which perception is performed throughout the entire period of time, partial perception in which perception is performed only on a part of the entire period, and random selection of time-frequency resource block without perception.

Note 22. The receiving electronic apparatus according to any one of Notes 12 to 21, wherein the processing circuitry is configured to report the assistance information in a scenario of sidelink resource selection mode 2.

Note 23. A receiving electronic apparatus for wireless communication, comprising processing circuitry configured to:

report assistance information to at least one transmitting electronic apparatus of transmitting electronic apparatuses in communication with the receiving electronic apparatus with a predetermined period and via a predetermined channel, wherein the assistance information is used for assisting the at least one transmitting electronic apparatus to perceive time-frequency resource block(s).

Note 24. The receiving electronic apparatus of Note 23, wherein:

the predetermined channel is a physical sidelink feedback assistance channel associated in time with a physical sidelink feedback channel, PSFCH, and the predetermined period is the same as a period of the PSFCH feeding back hybrid automatic repeat request acknowledgment, HARQ-ACK.

Note 25. The receiving electronic apparatus according to Note 24, wherein the physical sidelink feedback assistance channel is implemented by one orthogonal frequency division multiplexing. OFDM, symbol immediately before the PSFCH.

Note 26. The receiving electronic apparatus according to Note 24 or 25, wherein the processing circuitry is configured to divide, in frequency, time-frequency resources of the physical sidelink feedback assistance channel into frequency division multiplexed time-frequency resource blocks respectively corresponding to the at least one transmitting electronic apparatus, and perform the report to the corresponding transmitting electronic apparatus through the frequency division multiplexed time-frequency resource blocks.

Note 27. The receiving electronic apparatus according to Note 23, wherein the predetermined channel is the physical sidelink shared channel, PSSCH, and an indication field in the sidelink control information, SCI, indicates that the PSSCH transmits the assistance information, wherein the SCI comprises a first phase SCI as control information transmitted on a control channel or a second phase SCI as control information transmitted on a data channel.

Note 28. The receiving electronic apparatus according to any one of Notes 23 to 27, wherein the processing circuitry is configured to report the assistance information in a scenario of sidelink resource selection mode 2.

Note 29. A transmitting electronic apparatus for wireless communication, comprising processing circuitry configured to:

receive assistance information reported from at least one receiving electronic apparatus of receiving electronic apparatuses in communication with the transmitting electronic apparatus with a predetermined period and via a predetermined channel, wherein the assistance information is used for assisting the transmitting electronic apparatus to perceive time-frequency resource block(s).

Note 30. The transmitting electronic apparatus according to Note 29, wherein the predetermined channel is a physical sidelink feedback assistance channel associated in time with a physical sidelink feedback channel, PSFCH, of the at least one receiving electronic apparatus, and the predetermined period is the same as a period of the PSFCH feeding back hybrid automatic repeat request acknowledgment, HARQ-ACK.

Note 31. The transmitting electronic apparatus according to Note 30, wherein the physical sidelink feedback assistance channel is implemented by an orthogonal frequency division multiplexing, OFDM, symbol immediately before the PSFCH.

Note 32. The transmitting electronic apparatus according to Note 29, wherein the predetermined channel is a physical sidelink shared channel, PSSCH, and the processing circuitry is configured to know that the PSSCH transmits the assistance information through an indication field in the sidelink control information, SCI, received from the at least one receiving electronic apparatus, wherein the SCI comprises a first phase SCI as control information transmitted on a control channel or a second phase SCI as control information transmitted on a data channel.

Note 33. The transmitting electronic apparatus according to any one of Notes 29 to 32, wherein the processing circuitry is configured to receive the assistance information in a scenario of sidelink resource selection mode 2.

Note 34. A transmitting electronic apparatus for wireless communication, comprising processing circuitry configured to:

request by predetermined information, in a manner of event trigger, at least one receiving electronic apparatus of receiving electronic apparatuses in communication with the transmitting electronic apparatus to report assistance information for assisting the transmitting electronic apparatus to perceive time-frequency resource block(s), and receive the assistance information reported via a periodic channel of the at least one receiving electronic apparatus.

Note 35. The transmitting electronic apparatus according to Note 34, wherein

The predetermined information is sidelink control information, SCI, and the SCI comprises a first phase SCI as control information transmitted on a control channel or a second phase SCI as control information transmitted on a data channel.

Note 36. The transmitting electronic apparatus according to Note 34, wherein the predetermined information is a medium access control element, MAC CE.

Note 37. The transmitting electronic apparatus according to any one of Notes 34 to 36, wherein the periodic channel is a physical sidelink feedback channel, PSFCH.

Note 38. The transmitting electronic apparatus according to Note 37, wherein the processing circuitry is configured to receive assistance information represented by cyclic shift of a sequence in the PSFCH used to feed back hybrid automatic repeat request acknowledgment, HARQ-ACK.

Note 39. The transmitting electronic apparatus according to Note 37, wherein the processing circuitry is configured to receive assisting information reflected by reflection information added in the PSFCH, and the reflection information reflects whether the reserved resource of the transmitting electronic apparatus is occupied, and/or the reflection information recommends a time-frequency resource block for use by the transmitting electronic apparatus or a time-frequency resource block not for use by the transmitting electronic apparatus.

Note 40. The transmitting electronic apparatus according to Note 37, wherein the processing circuitry is configured to receive assistance information fed back through a sequence in the PSFCH for feeding back hybrid automatic repeat request acknowledgment, HARQ-ACK, and an indication field is added to the sidelink control information, SCI of the at least one receiving electronic apparatus to indicate that the sequence in the PSFCH used to feed back the HARQ-ACK is replaced to feed back the assistance information.

Note 41. The transmitting electronic apparatus according to any one of Notes 34 to 36, wherein the periodic channel is a physical sidelink feedback assistance channel associated with the physical sidelink feedback channel, PSFCH in time, wherein a period of the physical sidelink feedback assistance channel is the same as a period of the PSFCH feeding back hybrid automatic repeat request acknowledgment, HARQ-ACK.

Note 42. The transmitting electronic apparatus according to Note 41, wherein the physical sidelink feedback assistance channel is implemented by an orthogonal frequency division multiplexing, OFDM, symbol immediately before the PSFCH.

Note 43. The transmitting electronic apparatus according to any one of Notes 41 to 42, wherein the processing circuitry is configured to instruct, through sidelink control information, SCI, the at least one receiving electronic apparatus to report the assistance information through the physical sidelink feedback assistance channel.

Note 44. The transmitting electronic apparatus according to any one of Notes 34 to 43, wherein the processing circuitry is configured to receive the assistance information in a scenario of sidelink resource selection mode 2.

Note 45. A receiving electronic apparatus for wireless communication, comprising processing circuitry configured to:

receive, by predetermined information of at least one transmitting electronic apparatus of transmitting electronic apparatuses in communication with the receiving electronic apparatus, an indication which requests to report assistance information for assisting the at least one transmitting electronic apparatus to perceive time-frequency resource block(s) in a manner of event trigger, and report the assistance information to the at least one transmitting electronic apparatus via a periodic channel.

Note 46. The receiving electronic apparatus according to Note 45, wherein the predetermined information is sidelink control information, SCI, and the SCI comprises a first phase SCI as control information transmitted on a control channel or a second phase SCI as control information transmitted on a data channel.

Note 47. The receiving electronic apparatus according to Note 45, wherein the predetermined information is a medium access control element, MAC CE.

Note 48. The receiving electronic apparatus according to any one of Notes 45 to 47, wherein the periodic channel is a physical sidelink feedback channel, PSFCH.

Note 49. The receiving electronic apparatus according to Note 48, wherein the processing circuitry is configured to report the assistance information through cyclic shift of the sequence in the PSFCH used to feed back hybrid automatic repeat request acknowledgment, HARQ-ACK.

Note 50. The receiving electronic apparatus according to Note 48, wherein the processing circuitry is configured to report the assistance information through reflection information added in the PSFCH, and the reflection information reflects whether reserved resource of the at least one transmitting electronic apparatus is occupied, and/or the reflection information recommends a time-frequency resource block for use by the at least one transmitting electronic apparatus or a time-frequency resource block not for use by the at least one transmitting electronic apparatus.

Note 51. The receiving electronic apparatus according to Note 48, wherein the processing circuitry is configured to report the assistance information through a sequence in the PSFCH used to feed back hybrid automatic repeat request acknowledgment, HARQ-ACK, and an indication field is added to the sidelink control information, SCI of the receiving electronic apparatus to indicate that the sequence in the PSFCH used to feed back the HARQ-ACK is replaced to feed back the assistance information.

Note 52. The receiving electronic apparatus according to any one of Notes 45 to 47, wherein the periodic channel is a physical sidelink feedback assistance channel associated with the physical sidelink feedback channel, PSFCH in time, wherein a period of the physical sidelink feedback assistance channel is the same as a period of the PSFCH feeding back hybrid automatic repeat request acknowledgment, HARQ-ACK.

Note 53. The receiving electronic apparatus according to Note 52, wherein the physical sidelink feedback assistance channel is implemented by an orthogonal frequency division multiplexing, OFDM, symbol immediately before the PSFCH.

Note 54. The receiving electronic apparatus according to any one of Notes 45 to 53, wherein the processing circuitry is configured to report the assistance information in a scenario of sidelink resource selection mode 2.

Note 55. A method for wireless communication, wherein the method is performed by a transmitting electronic apparatus, and the method comprises:

requesting by predetermined information, in a manner of event trigger, at least one receiving electronic apparatus of receiving electronic apparatuses in communication with the transmitting electronic apparatus to report assistance information for assisting the transmitting electronic apparatus to perceive time-frequency resource block(s), and receiving the assistance information reported via an aperiodic channel of the at least one receiving electronic apparatus.

Note 56. A method for wireless communication, wherein the method is performed by a receiving electronic apparatus, and the method comprises:

receiving, by predetermined information of at least one transmitting electronic apparatus of transmitting electronic apparatuses in communication with the receiving electronic apparatus, an indication which requests to report assistance information for assisting the at least one transmitting electronic apparatus to perceive time-frequency resource block(s) in a manner of event trigger, and transmitting the assistance information to the at least one transmitting electronic apparatus via an aperiodic channel.

Note 57. A method for wireless communication, wherein the method is performed by a receiving electronic apparatus, and the method comprises:

reporting assistance information to at least one transmitting electronic apparatus of transmitting electronic apparatuses in communication with the receiving electronic apparatus with a predetermined period and via a predetermined channel, wherein the assistance information is used for assisting the at least one transmitting electronic apparatus to perceive time-frequency resource block(s).

Note 58. A method for wireless communication, wherein the method is performed by a transmitting electronic apparatus, and the method comprises:

receiving assistance information reported from at least one receiving electronic apparatus of receiving electronic apparatuses in communication with the transmitting electronic apparatus with a predetermined period and via a predetermined channel, wherein the assistance information is used for assisting the transmitting electronic apparatus to perceive time-frequency resource block(s).

Note 59. A method for wireless communication, wherein the method is performed by a transmitting electronic apparatus, and the method comprises:

requesting by predetermined information, in a manner of event trigger, at least one receiving electronic apparatus of receiving electronic apparatuses in communication with the transmitting electronic apparatus to report assistance information for assisting the transmitting electronic apparatus to perceive time-frequency resource block(s), and receiving the assistance information reported via a periodic channel of the at least one receiving electronic apparatus.

Note 60. A method for wireless communication, wherein the method is performed by a receiving electronic apparatus, and the method comprises:

receiving, by predetermined information of at least one transmitting electronic apparatus of transmitting electronic apparatuses in communication with the receiving electronic apparatus, an indication which requests to report assistance information for assisting the at least one transmitting electronic apparatus to perceive time-frequency resource block(s) in a manner of event trigger, and transmitting the assistance information to the at least one transmitting electronic apparatus via a periodic channel.

Note 61. A computer-readable storage medium having stored thereon computer-executable instructions that, when executed, perform the method for wireless communication according to any one of Notes 55 to 60.

The invention claimed is:

1. A transmitting electronic apparatus for wireless communication, comprising:

processing circuitry configured to:

request by predetermined information, in a manner of an event trigger, at least one receiving electronic apparatus of receiving electronic apparatuses in communication with the transmitting electronic apparatus to report assistance information for assisting the transmitting electronic apparatus to perceive time-frequency resource block(s), receive the assistance information reported via an aperiodic channel of the at least one receiving electronic apparatus, perceive the time-frequency resource block(s) by performing a union or an intersection of the assistance information reported via the aperiodic channel of the at least one receiving electronic apparatus and candidate time-frequency resources perceived by the transmitting electronic apparatus itself, and receive from the at least one receiving electronic apparatus a perception type of the at least one receiving electronic apparatus for the time-frequency resource block(s) and/or discontinuous reception, DRX, configuration, wherein the perception type comprises full perception in which perception is performed throughout an entire period of time, partial perception in which perception is performed only on a part of the entire period of time, and random selection of the time-frequency resource block(s) without perception.

2. The transmitting electronic apparatus according to claim 1, wherein the predetermined information is sidelink control information, SCI, and the SCI comprises a first phase SCI as control information transmitted on a control channel or a second phase SCI as control information transmitted on a data channel.

3. The transmitting electronic apparatus according to claim 2, wherein the aperiodic channel is a second phase SCI.

4. The transmitting electronic apparatus according to claim 1, wherein the predetermined information is a medium access control element, MAC CE.

5. The transmitting electronic apparatus according to claim 4, wherein the aperiodic channel is a physical sidelink shared channel, PSSCH.

6. The transmitting electronic apparatus according to claim 1, wherein the processing circuitry is configured to request the at least one receiving electronic apparatus through an assistance request field comprised in the predetermined information.

7. The transmitting electronic apparatus according to claim 6, wherein the processing circuitry is configured to receive reflection information based on an assistance request field in the predetermined information fed back from the at least one receiving electronic apparatus, and wherein the reflection information is used to reflect whether the time-frequency resource block(s) involved in the assistance information is a time-frequency resource block recommended for use by the transmitting electronic apparatus or a time-frequency resource block not recommended for use by the transmitting electronic apparatus.

8. The transmitting electronic apparatus according to claim 1, wherein the processing circuitry is configured to further send data packet information related to a data packet of the transmitting electronic apparatus to the at least one receiving electronic apparatus.

9. The transmitting electronic apparatus according to claim 8, wherein the data packet information comprises a priority and/or a packet delay budget of the data packet.

10. The transmitting electronic apparatus according to claim 1, wherein the processing circuitry is configured to receive the assistance information in a scenario of sidelink resource selection mode 2.

11. A receiving electronic apparatus for wireless communication, comprising processing circuitry configured to:

receive, by predetermined information of at least one transmitting electronic apparatus of transmitting electronic apparatuses in communication with the receiving electronic apparatus, an indication which requests to report assistance information for assisting the at least one transmitting electronic apparatus to perceive time-frequency resource block(s) in a manner of event trigger, transmit the assistance information to the at least one transmitting electronic apparatus via an aperiodic channel, the assistance information being formatted for the at least one transmitting electronic apparatus to perform a union or an intersection of the assistance information reported via the aperiodic channel of the receiving electronic apparatus and candidate time-frequency resources perceived by the at least one transmitting electronic apparatus itself;

report a perception type of the receiving electronic apparatus for the time-frequency resource block(s) and/or a discontinuous reception, DRX, configuration to the at least one transmitting electronic apparatus, wherein the perception type comprises full perception in which perception is performed throughout an entire period of time, partial perception in which perception is performed only on a part of the entire period of time, and random selection of the time-frequency resource block(s) without perception.

12. The receiving electronic apparatus according to claim 11, wherein the predetermined information is sidelink control information, SCI, and the SCI comprises a first phase SCI as control information transmitted on a control channel or a second phase SCI as control information transmitted on a data channel.

13. The receiving electronic apparatus according to claim 12, wherein the aperiodic channel is a second phase SCI.

14. The receiving electronic apparatus according to claim 11, wherein the predetermined information is a medium access control element, MAC CE.

15. The receiving electronic apparatus according to claim 14, wherein the aperiodic channel is a physical sidelink shared channel, PSSCH.

16. The receiving electronic apparatus according to claim 11, wherein the processing circuitry is configured to receive the indication through an assistance request field comprised in the predetermined information.

17. The receiving electronic apparatus according to claim 11, wherein the processing circuitry is configured to further receive data packet information related to a data packet of the at least one transmitting electronic apparatus from the at least one transmitting electronic apparatus.

18. A receiving electronic apparatus for wireless communication, comprising processing circuitry configured to:

report assistance information to at least one transmitting electronic apparatus of transmitting electronic apparatuses in communication with the receiving electronic apparatus with a predetermined period and via a predetermined channel, the assistance information being formatted for the at least one transmitting electronic apparatus to perform a union or an intersection of the assistance information reported via the predetermined channel of the receiving electronic apparatus and candidate time-frequency resources perceived by the at least one transmitting electronic apparatus itself; and report a perception type of the receiving electronic apparatus for the time-frequency resource block(s) and/or a discontinuous reception, DRX, configuration to the at least one transmitting electronic apparatus, wherein the perception type comprises full perception in which perception is performed throughout an entire period of time, partial perception in which perception is performed only on a part of the entire period of time, and random selection of the time-frequency resource block(s) without perception, wherein the assistance information is used for assisting the at least one transmitting electronic apparatus to perceive time-frequency resource block(s).

* * * * *